US005448299A

United States Patent [19]
Yang et al.

[11] Patent Number: 5,448,299
[45] Date of Patent: Sep. 5, 1995

[54] APPARATUS FOR PROCESSING BPSK SIGNALS TRANSMITTED WITH NTSC TV ON QUADRATURE-PHASE VIDEO CARRIER

[75] Inventors: Jian Yang, Bensalem, Pa.; Allen L. Limberg, Ringoes, N.J.

[73] Assignee: Samsung Electronics Co., Ltd., Kyungki-do, Rep. of Korea

[21] Appl. No.: 179,588

[22] Filed: Jan. 5, 1994

[51] Int. Cl.$^6$ ............................................. H04N 7/04
[52] U.S. Cl. ............................ 348/475; 348/470; 348/484; 375/301; 375/329
[58] Field of Search ............. 348/470, 462, 475, 484, 348/466, 456, 533; 375/61, 52, 80, 83; 329/304, 356, 357; H04N 7/04, 5/08

[56] References Cited

U.S. PATENT DOCUMENTS

| | | | |
|---|---|---|---|
| 4,876,698 | 10/1989 | Boisson et al. | 348/466 |
| 5,053,860 | 10/1991 | Trinberg | 348/437 |
| 5,063,446 | 11/1991 | Gibson | 348/484 |
| 5,229,847 | 7/1993 | Gibson | 348/475 |
| 5,278,637 | 1/1994 | Naimpally | 348/488 |

OTHER PUBLICATIONS

T. C. Leslie and B. Singh, "An Improved Sigma-Delta Modulator Architecture", 1990 IEEE Symposium on Circuits & Systems, 90 CH 2868-8900000-0372, pp. 372-375.

Primary Examiner—James J. Groody
Assistant Examiner—Jeffrey S. Murrell
Attorney, Agent, or Firm—Sughrue, Mion, Zinn, Macpeak & Seas

[57] ABSTRACT

A vestigial-sideband amplitude-modulation transmitter using a balanced modulator for generating a suppressed carrier that is in quadrature phasing with the video carrier of a television signal receives as modulating signal a binary phase-shift-keying (BPSK) signal encoding digital signals. The quadrature transmission reduces the visibility of the lower-frequency PSK sidebands in the TV signal as viewed on screen. The symbol rate of the PSK is made to be a multiple of the horizontal line scan rate of video signal. To reduce the visibility of the higher-frequency PSK sidebands in the TV signal as viewed on screen, the BPSK is transmitted twice during respective frames of successive pairs of data frames, which data frames recur at the same rate as video frames. To reduce the interference of video with the BPSK, the BPSK is comb filtered at the digital signal receiver and after symbol detection is subjected to partial-response filtering for recovering the digital signal originally encoded in the BPSK signal.

16 Claims, 13 Drawing Sheets

APPARATUS FOR PROCESSING BPSK SIGNALS TRANSMITTED WITH NTSC TV ON QUADRATURE-PHASE VIDEO CARRIER

The invention relates to transmitters for burying digital signals in analog television signals and receivers for recovering digital signals buried in analog television signals.

BACKGROUND OF THE INVENTION

Relatively small (e.g., 3 to 5 IRE) signals encoding digital information can be admixed together with composite video signals without being objectionably evident in television pictures generated from those composite video signals if suitable restrictions on the digital signal format are observed. This is pointed out by A. L. R. Limberg, C. B. Patel and T. Liu in their U.S. patent application Ser. No. 08/108,311 filed 20 Aug. 1993, entitled APPARATUS FOR PROCESSING MODIFIED NTSC TELEVISION SIGNALS, WITH DIGITAL SIGNALS BURIED THEREWITHIN, and incorporated by reference herein. Limberg et alii describe phase-shift-keyed (PSK) modulation of a subcarrier having a frequency that is an odd multiple of one-half scan line frequency. The phase shift keying is done responsive to serial-bit digital data supplied at a symbol rate that is a multiple of one scan line frequency. Limberg et alii prefer repeating frames of the modulated subcarrier in antiphase in successive pairs of consecutive frames of the NTSC television signal. Because of frame-averaging effects resulting from the limitations on the speeds of the response of the human visual system and the decay of electroluminescence of kinescope phosphors, such repetition of data in pairs of frames makes PSK subcarrier accompanying the composite video signal detected from the NTSC television signal less visible in images that are generated from the composite video signal for viewing on a screen. Such repetition of data in pairs of frames also provides a basis for using frame-comb filtering in a digital signal receiver to separate PSK subcarrier from the luminance portion of the composite video signal that describes static portions of successive television images. Limberg et alii prefer also repeating the modulation of the digital data in antiphase in contiguous pairs of adjoining scan lines of the NTSC television signal, providing a basis for using line-comb filtering in the digital signal receiver to separate PSK subcarrier from the chrominance portion of the composite video signal.

Limberg et alii describe a suppressed, vestigial-sideband, amplitude-modulated (VSB AM) carrier of the same frequency as the VSB AM picture carrier, but in quadrature phasing therewith, being used to transmit a suppressed subcarrier modulated with digital data. The modulation scheme Limberg et alii prefer is binary phase-shift-keying of a PSK carrier, a single-sideband (SSB) of which is selected for translation in frequency to form an upper sideband of a suppressed subcarrier that is at a frequency which is a small odd multiple of one-half scan line frequency. In each of the digital signal receivers described by Limberg et alii synchronous detection of the quadrature-phase VSB AM carrier recovers the digital subcarrier, without substantial accompanying composite video signal energy in the baseband extending up to 0.75 MHz frequency. Above 0.75 MHz the VSB AM video carrier begins the transition from being a double-sideband amplitude-modulated (DSB AM) carrier to being a single-sideband amplitude-modulated (SSB AM) carrier. The composite video signal is detected with gradually increasing efficiency up to the 1.25 MHz frequency at which roll-off of the vestigial sideband is complete. Over the same 0.75 to 1.25 MHz frequency range the efficiency with which the digital subcarrier is detected gradually decreases to half its value below 0.75 MHz. A synchronous video detector detecting the quadrature-phase VSB AM video carrier will, providing the intermediate-frequency (IF) amplifier passes the vestigial sideband, generate a response to the PSK subcarrier and remnants of NTSC composite video signal that does not include direct components or synchronizing pulses. This reduces the dynamic range of the synchronous video detector response to the quadrature-phase VSB AM video carrier, easing the problem of digitizing the response without losing low-level PSK subcarriers because of quantization effects.

Limberg et alii describe a digital signal receiver in which the synchronous video detector for quadrature-phase VSB AM video carrier is followed by a cascade connection of a lowpass line-comb filter and a highpass frame-comb filter. The lowpass line-comb filter is for separating the frequency spectrum of a PSK subcarrier having a frequency that is an odd multiple of half-scan-line frequency from chrominance signal portions of the frequency spectrum of an NTSC signal, particularly of an NTSC signal that has been appropriately pre-filtered. The highpass frame-comb filter is for separating the frequency spectrum of a PSK subcarrier having a frequency that is an odd multiple of half-scan-line frequency from motion-free luminance signal portions of the frequency spectrum of an NTSC signal. Limberg et alii teach that the remnant spectrum of the NTSC signal in the response of the cascaded highpass comb filters can be viewed as the frequency spectrum of a jamming signal accompanying the PSK signal. Accordingly, the remnant spectrum of the NTSC signal in the response of the cascaded highpass comb filters can be discriminated against by synchronous symbol detection.

Two different types of partial-response filtering are of interest in regard to the inventions disclosed in this specification and its drawing. Digital delay lines as used in these filters are commonly constructed using random-access memories (RAMs) arranged for operation in a read-then-write-over mode while being addressed by an address counter counting the number of samples per line in the case of a "1-H" digital delay line or counting the number of samples per frame in the case of a "1-F" digital delay line.

A first type of partial-response filter of particular interest is referred to as a "line-comb" partial-response filter in this specification. This filter is composed of one or more sections, each of which sections includes a respective two-input exclusive-OR (XOR) gate having a first input for receiving serial-bit data for partial-response filtering and an output from which section response is taken. Each section further includes a "1-H" digital delay line for applying the section response, as delayed by "1-H" which is the duration of one horizontal scan line in an NTSC television signal, to the second input of the XOR gate in that section. A "line-comb" partial-response filter referred to more specifically as a "pre-line-comb" partial-response filter precedes a line-comb filter, and a "line-comb" partial-response filter referred to more specifically as a "post-line-comb" partial-response filter follows a line-comb filter and is of particular interest in regard to the inventions herein described.

A second type of partial-response filter of particular interest is referred to as a "frame-comb" partial-response filter in this specification. This filter is composed of one or more sections, each of which sections includes a respective two-input exclusive-OR (XOR) gate having a first input for receiving serial-bit data for partial-response filtering and an output from which section response is taken. Each section further includes a "1-F" digital delay line for applying the section response, as delayed by "1-F" which is the duration of one frame of NTSC television signal, to the second input of the XOR gate in that section. A "frame-comb" partial-response filter referred to more specifically as a "pre-frame-comb" partial-response filter precedes a frame-comb filter, and a "frame-comb" partial-response filter referred to more specifically as a "post-frame-comb" partial-response filter follows a frame-comb filter and is of particular interest in regard to the inventions herein described.

J. Yang describes binary phase-shift-keyed (BPSK) modulation of a suppressed carrier that is the same frequency as a video carrier and is in quadrature phasing therewith in his U.S. patent application Ser. No. 08/141,070, filed 26 Oct. 1993, entitled APPARATUS FOR PROCESSING NTSC TV SIGNALS HAVING DIGITAL SIGNALS ON QUADRATURE-PHASE VIDEO CARRIER and incorporated herein by reference. Yang also advocates repeating frames of the BPSK in antiphase in successive pairs of consecutive frames of the NTSC television signal, just as Limberg et alii do. Yang advocates the BPSK signals being constrained to about 2 MHz bandwidth, so as to avoid crosstalk into chroma in TV receivers that separate chroma from luma without recourse to comb filtering. Yang indicates a preference for passing the data to be transmitted through a pre-line-comb partial-response filter prior to its digital-to-analog conversion to an analog modulating signal for a balanced amplitude modulator. This is done to preserve the information contained therein when line-comb filtering is done in the digital signal receiver to separate PSK subcarrier from the luminance portion of the composite video signal. Line-comb filtering in the digital signal receiver converts the partial-response filtered binary digital signal to ternary digital signal, if the line-comb filtering is of the two-tap type, linearly combining signals differentially delayed by only the duration of one horizontal scan line of video signal. Line-comb filtering in the digital signal receiver converts the partial-response filtered binary digital signal to five-level digital signal, if the line-comb filtering is of the three-tap type, linearly combining signals differentially delayed by the duration of one horizontal scan line of video signal and by the duration of two horizontal scan lines of video signal. Therefore, multi-level symbol decision circuitry is required to recover bit-serial digital data transmitted by the BPSK from the comb filtering response.

A U.S. patent application Ser. No. 08/179,618 filed 5 Jan. 1994 by J. Yang and A. L. R. Limberg, entitled "PRE-FRAME-COMB" AS WELL AS "PRE-LINE-COMB" PARTIAL-RESPONSE FILTERING OF BPSK BURIED IN A TV SIGNAL, describes a pre-frame-comb partial-response filter as well as pre-line-comb partial-response filtering being used at the digital signal transmitter. Line-comb filtering in the digital signal receiver converts the partial-response filtered binary digital signal to five-level digital signal, if the line-comb filtering is of the two-tap type, linearly combining signals differentially delayed by only the duration of one horizontal scan line of video signal. Line-comb filtering in the digital signal receiver converts the partial-response filtered binary digital signal to nine-level digital signal, if the line-comb filtering is of the three-tap type, linearly combining signals differentially delayed by the duration of one horizontal scan line of video signal and by the duration of two horizontal scan lines of video signal.

Receivers for the Yang system are also described by T. V. Bolger in his U.S. patent application Ser. No. 08/141,071, filed 26 Oct. 1993, entitled RECEIVER WITH OVERSAMPLING ANALOG-TO-DIGITAL CONVERSION FOR DIGITAL SIGNALS WITHIN TV SIGNALS, and incorporated herein by reference. These receivers digitize the response of a quadrature-phase video detector using an oversampling analog-to-digital converter. The digitized quadrature-phase video detector response is subjected to digital frame-comb and line-comb filtering to suppress remnant composite video signals; the comb filtering response is supplied to multi-level symbol decision circuitry to recover bit-serial digital data transmitted by the BPSK; and the bit-serial digital data is supplied to a decoder that corrects the digital information in the data using forward-error-correcting codes contained therein.

Receivers for the Yang system are also described by J. Yang, T. V. Bolger and A. L. R. Limberg in their U.S. patent application Ser. No. 08/179,586, filed 5 Jan. 1994, entitled RECEIVER WITH SIGMA-DELTA ANALOG-TO-DIGITAL CONVERSION FOR DIGITAL SIGNALS BURIED IN TV SIGNALS, and incorporated herein by reference. These receivers digitize the response of a quadrature-phase video detector using an oversampling analog-to-digital converter of sigma-delta type. Preferably, the bit resolution of a basic multiple-bit-resolution flash converter is improved by using a sigma-delta procedure in which only a single bit of the basic multiple-bit-resolution ADC output signal is converted back to analog signal for feedback purposes during each oversampling step, as described by T. C. Leslie and B. Singh in their paper "An Improved Sigma-Delta Modulator Architecture", 1990 IEEE SYMPOSIUM ON CIRCUITS & SYSTEMS, 90 CH 2868-8900000-0372, pp. 372-375, incorporated herein by reference. The digitized quadrature-phase video detector response is subjected to digital frame-comb and line-comb filtering to suppress remnant composite video signals; the comb filtering response is supplied to multi-level symbol decision circuitry to recover bit-serial digital data transmitted by the BPSK; and the bit-serial digital data is supplied to a decoder that corrects the digital information in the data using forward-error-correcting codes contained therein.

The inventions described by A. L. R. Limberg et alii, by J. Yang, by T. V. Bolger, by J. Yang and A. L. R. Limberg, and by T. V. Bolger et alii in their respective patent applications, like the inventions described herein, are assigned to Samsung Electronics Co., Ltd., pursuant to pre-existing employee agreements so to assign inventions made within the scope of employment. In these patent applications the bit-serial data used for generating the binary phase-shift-keying signal have been processed at the transmitter so that the data will survive comb filtering procedures, which are carried out in the digital signal receiver for suppressing the composite video signals accompanying the data and tending to act as a jamming signal. With regard to operation of the combined NTSC television and BPSK transmitter, partial-response filtering of the bit-serial data subsequently used for generating the binary phase-shift-keying signal is advocated by each of these U.S. patent applications, except for Ser. No. 08/108,311.

SUMMARY OF THE INVENTION

The invention in aspects thereof relates to a system for transmitting digital information by binary phase-shift-keying a vestigial-sideband carrier, which carrier though suppressed would be in quadrature phasing with the vestigial-sideband carrier amplitude-modulated by composite video signal. Preferably, the digital information is placed into bit-serial format, with a bit rate that is a multiple of the horizontal line scan rate of the composite video signal, and the following further data formatting procedures are performed before converting the data to analog form for binary phase-shift-keying the vestigial-sideband carrier. A succession of data frames each of the same duration as a frame of composite video signal are defined, each data frame having a number of data rows therein equal to the number of horizontal scan lines in a frame of composite video signal. The successive data frames are identified by respective modular ordinal numbers consecutively assigned in order of their occurrence. The bit-serial data, which are not partial-response filtered, are apportioned for transmission in the odd-numbered data frames. The bit-serial data in each odd-numbered data frame is one's complemented to generate the data transmitted in the next even-numbered data frame. This transmission of the data twice, but in opposite logic senses, provides for frame averaging of the data accompanying video derived from the accompanying composite video signal in a television receiver and viewed on its viewing screen.

The invention relates in still further aspects thereof to a system for receiving the digital information transmitted without recourse to partial-response filtering via the vestigial-sideband binary phase-shift-keyed quadrature-phase carrier. After detection of the binary phase-shift-keying of the quadrature-phase carrier, the detected signal is symbol-comb filtered, line-comb filtered, frame-comb filtered, or comb filtered with one or more various combinations of symbol-comb filtering, line-comb filtering, and frame-comb filtering to suppress accompanying remnants of composite video signal before application to symbol decision circuitry. The results from the symbol decision circuitry are then subjected to appropriate partial-response filtering that recovers the originally transmitted digital information in bit-serial format.

Figure 4:
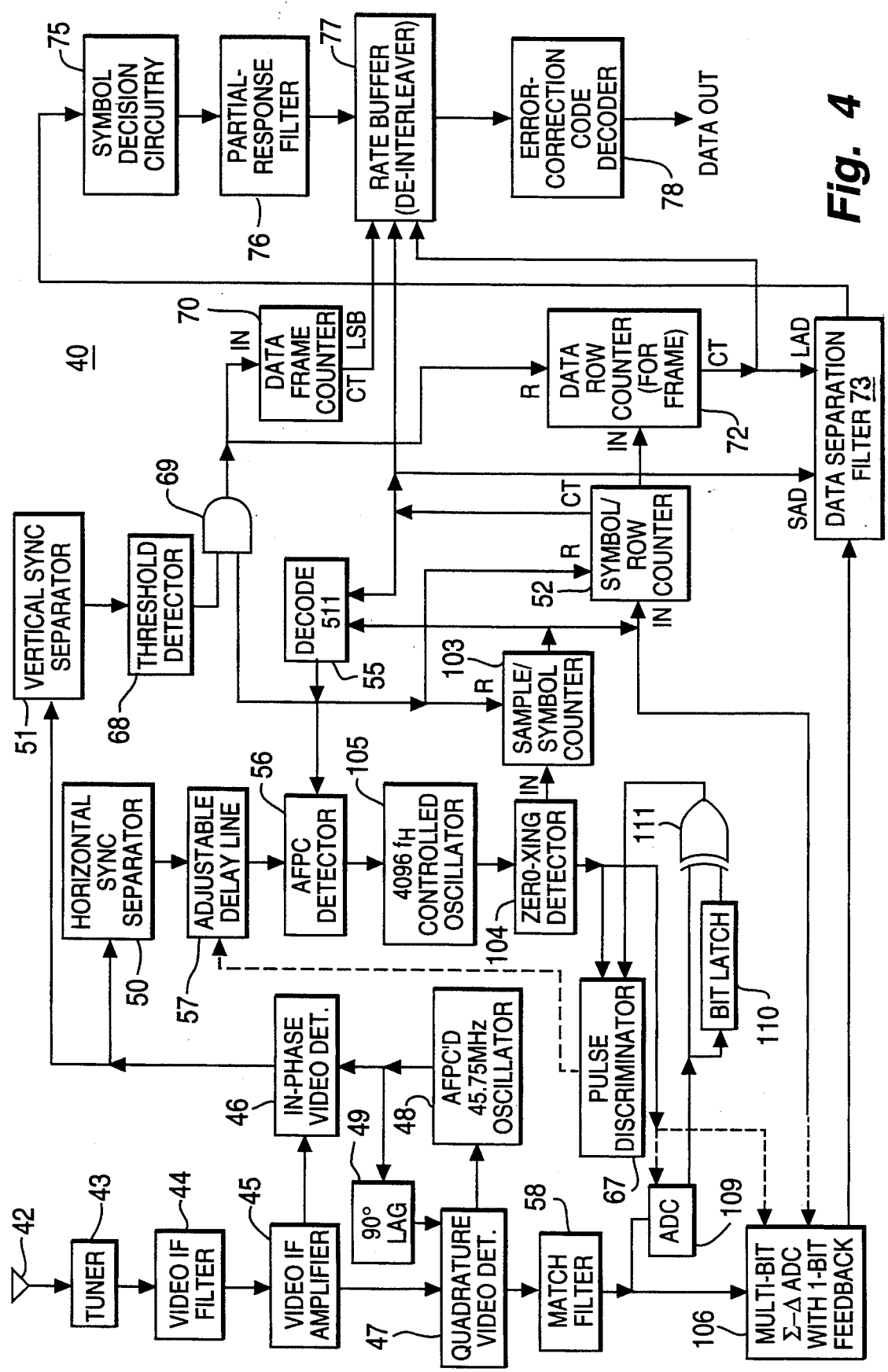
FIG. 4 is a schematic diagram of a digital-signal receiver for receiving a television signal with a digital signal buried therewithin and extracting the buried digital signal, which digital-signal receiver embodies further aspects of the invention.

Each of FIGS. 6–9 is a schematic diagram of an alternative form the data separation filter, symbol decision circuitry and post-comb partial-response filter can take in the FIG. 4 digital-signal receiver.

Figure 10:
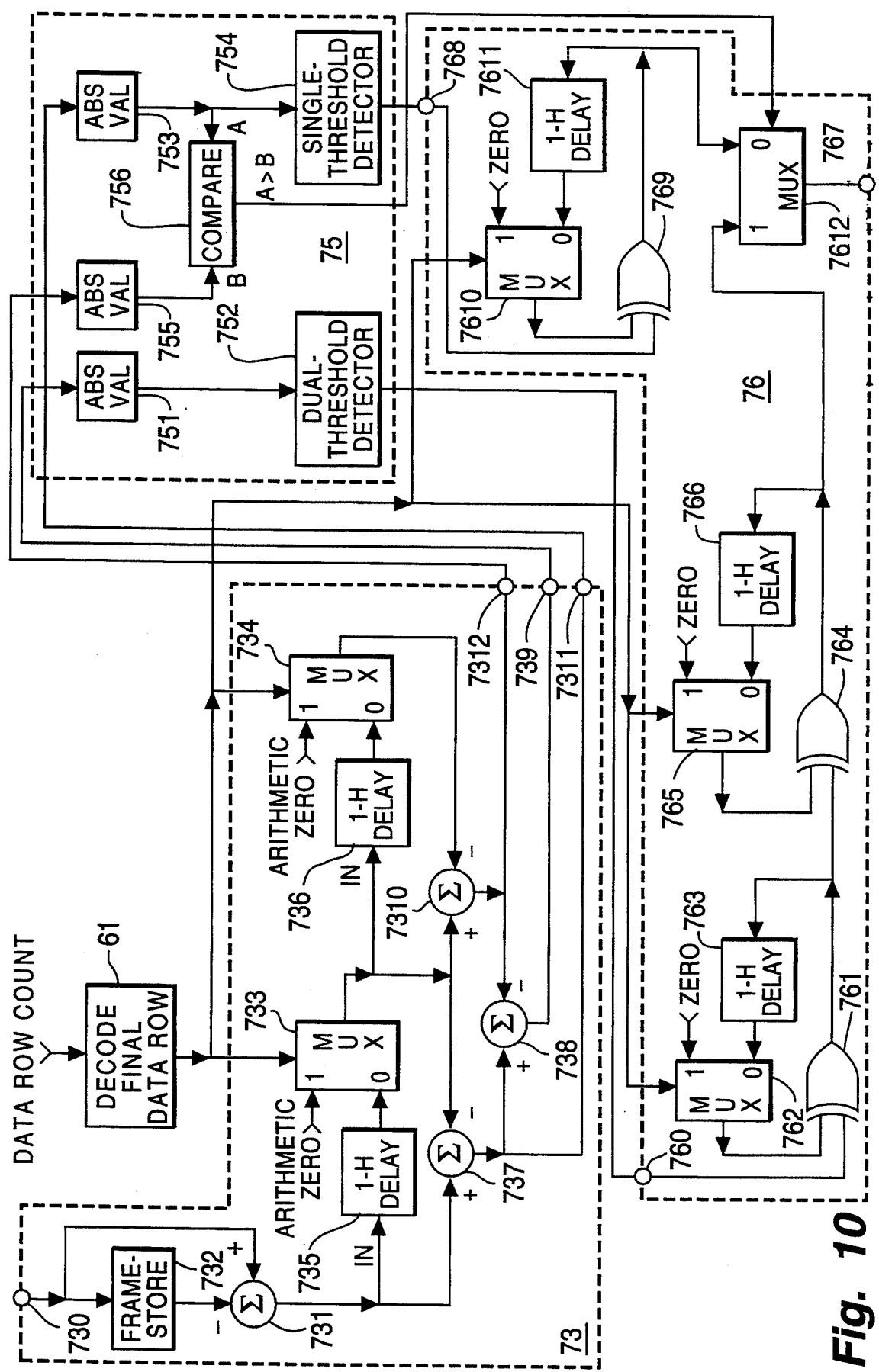

FIG. 10 is a schematic diagram of another form the data separation filter, symbol decision circuitry and post-comb partial-response filter can take in the FIG. 4 digital-signal receiver, when that digital signal receiver is of an adaptive type.

Figure 11:
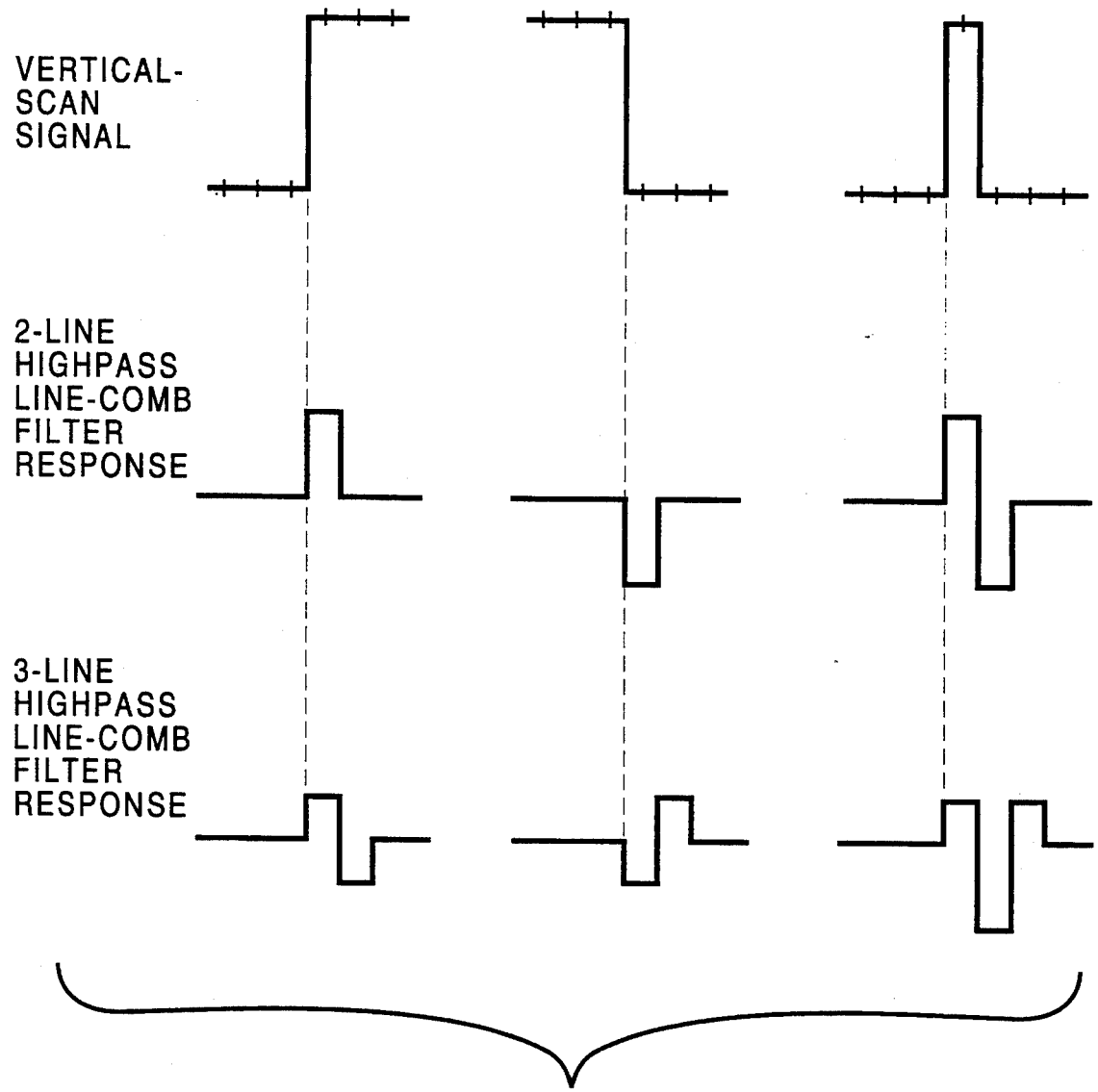

FIG. 11 is a chart of the differing line-comb filter responses of the alternative forms of data separation filter.

Figure 12:
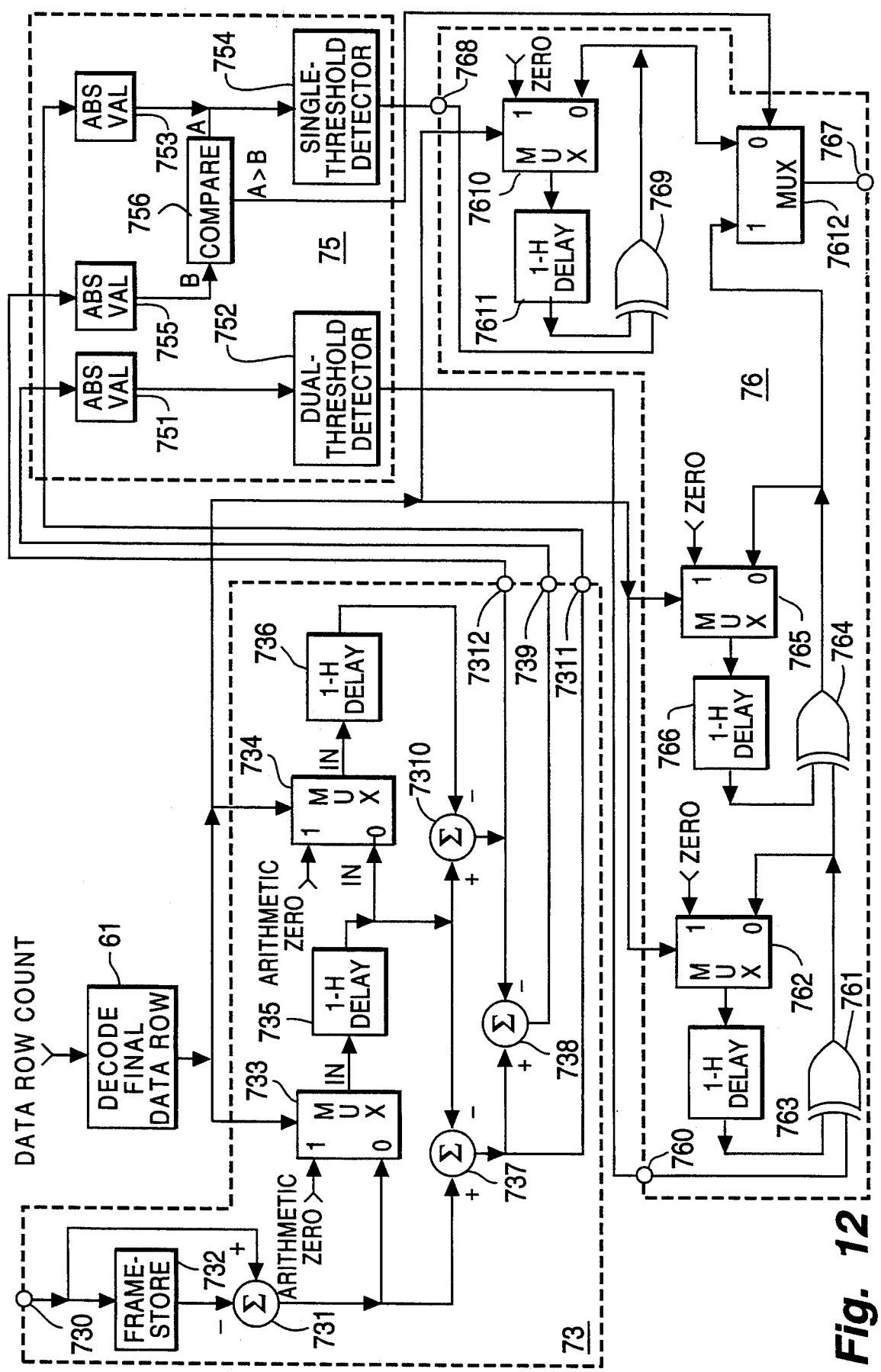

FIG. 12 is a schematic diagram of an alternative form the data separation filter, symbol decision circuitry and post-comb partial-response filter can take in the FIG. 4 digital-signal receiver, when that digital signal receiver is of an adaptive type.

Figure 13:
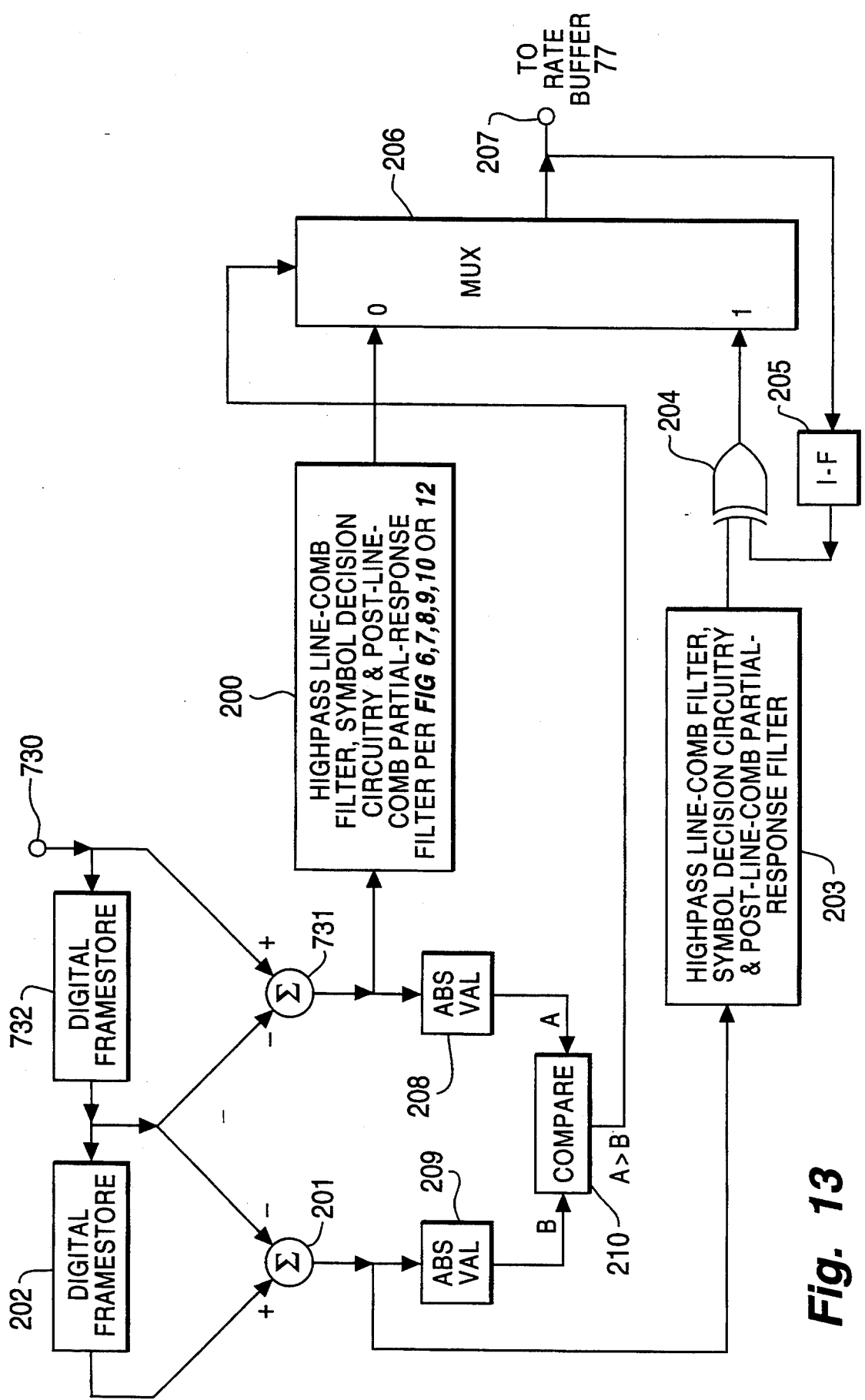

FIG. 13 is a schematic diagram of modifications that can be made in the FIG. 4 digital-signal receiver, when that digital signal receiver is of an adaptive type.

DETAILED DESCRIPTION

Generally, equalizing delays have been omitted from the drawing Figures to simplify them and to make them easier to understand. One skilled in the art of video signal processor design will appreciate the need for such delays to properly time-align pixels or data subject to different delays on different processing paths due to the differing processing performed in those paths. One skilled in the art would understand where such delays would be necessary and how long each of the delays would have to be, and such delays will not be described or discussed below. In logic circuitry, one skilled in the art would understand how to provide the shimming delays required to overcome undesired "logic race" conditions or to compensate for latent delays in performing logic operations; and details of logic circuitry design with regard to providing shimming delay will not be discussed below. Further, where an analog-to-digital converter (ADC) is shown or described in the present disclosure, one skilled in the art would understand the desirability of preceding such converter with an anti-aliasing lowpass filter, and how this could be implemented, and such will not be further described in detail below. Also, where a digital-to-analog converter (DAC) is shown or described in the present disclosure, one skilled in the art would understand the desirability of following such converter with a sampling clock rejection lowpass filter, and how this could be implemented, and such will not be further described in detail below.

Figure 1:
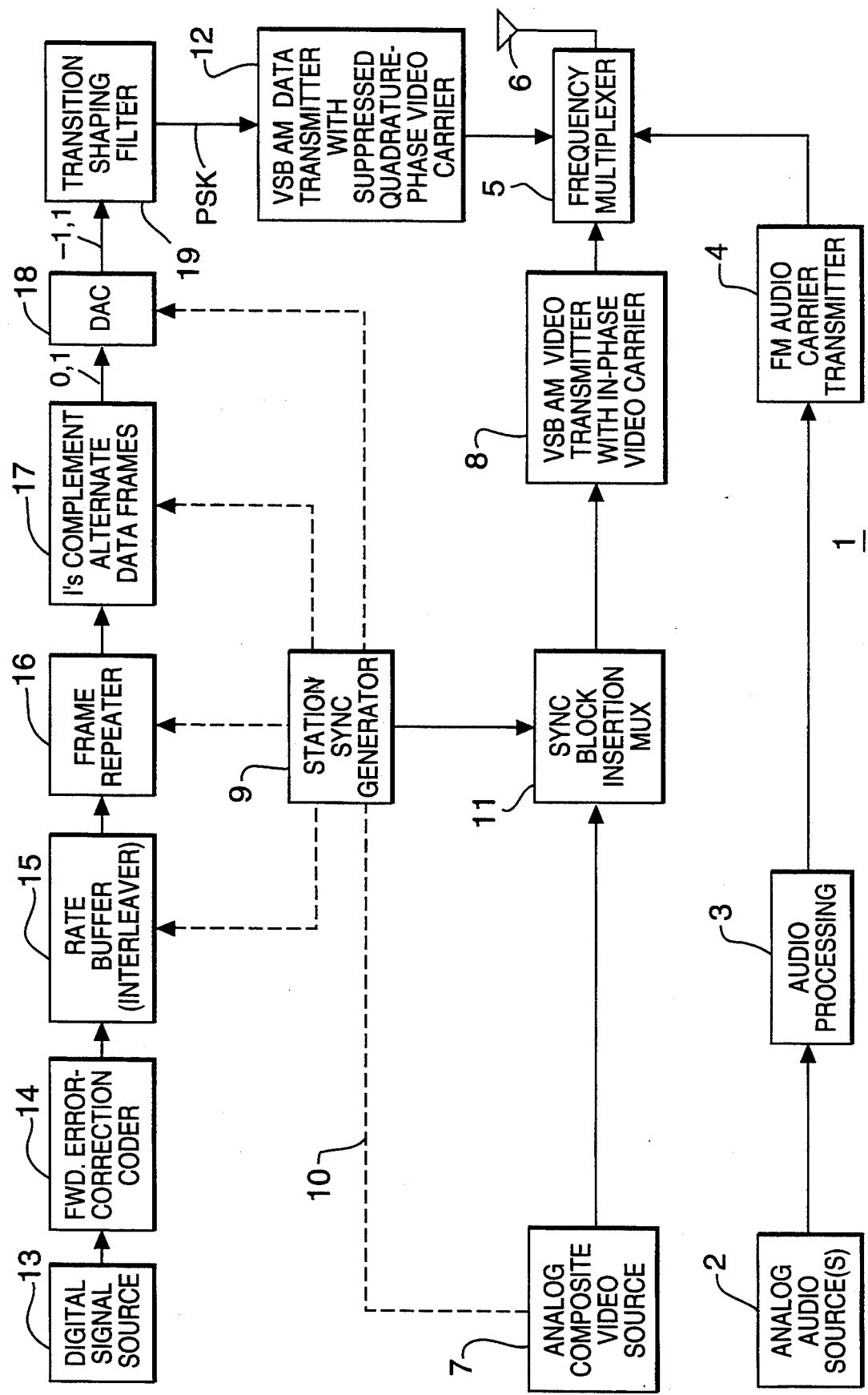
FIG. 1 is an overall schematic diagram of a television transmitter for transmitting a television signal with a digital signal buried therewithin, which television transmitter embodies aspects of the invention.

FIG. 1 shows a television transmitter 1 for transmitting a television signal with a digital signal buried therewithin. A source 2 supplies one or more analog audio signals to audio processing circuitry 3 which supplies a modulating signal to an audio carrier transmitter 4 for modulating the frequency of the audio carrier wave. The audio processing circuitry 3 includes delay as needed for synchronizing sound and picture. The audio processing circuitry 3, in accordance with customary practice, also includes pre-emphasis networks for the analog audio signal(s) and may include apparatus for generating stereophonic and secondary audio program (SAP) subcarriers for inclusion in the modulating signal supplied to the audio carrier transmitter 4. The frequency-modulated (FM) audio carrier is typically supplied from the transmitter 4 to a multiplexer 5 to be frequency-multiplexed with in-phase VSB AM picture carrier and quadrature-phase VSB BPSK data carrier. In a television transmitter 1 for over-the-air broadcasting, this multiplexer 5 typically takes the form of an antenna coupling network and the resulting frequency-multiplexed signal is broadcast from a transmitting antenna 6. A television transmitter for the head end of a cable broadcasting system will not have the transmitting antenna 6 used in over-the-air broadcasting. The multiplexer 5 will take different form, with the frequency-multiplexed signal from the channel under consideration being further frequency-multiplexed with the frequency-multiplexed signals from other channels, and with the resulting signal being applied by linear amplifiers to the trunk cables of the cable broadcasting system.

In FIG. 1 a source 7 supplies an analog composite video signal that is the basis for the modulating signal supplied to a transmitter 8 that in turn supplies the VSB AM picture carrier to the multiplexer 5, there to be frequency-multiplexed with the frequency-modulated (FM) sound carrier. The vertical synchronizing pulses, horizontal synchronizing pulses and color burst of analog composite video signal from the source 7 are synchronized with corresponding signals supplied by a station synchronizing signal generator 9. A control connection 10 between the source 7 of composite video signal and the station sync generator 9 symbolizes the means used for this synchronization. Where the source 7 is a remote generator of composite video signal, such as a downtown studio or another television station networked with the local television station, the control connection 10 may be a genlock connection to the station sync generator 9. Where the source 7 is a local camera, that local camera may receive synchronization information from the station sync generator 9 via the control connection 10. These and other synchronizing schemes including those for video tape recorders and telecine apparatus are familiar to those skilled in the art. Typically, a time-division multiplexer 11 is used to insert sync block information including vertical synchronizing pulses, horizontal synchronizing pulses, equalizing pulses, color burst and pedestals (commonly referred to as "porches") into the composite video signal applied as modulating signal to the picture carrier transmitter 8 in place of original sync block information.

The FIG. 1 television transmitter 1 differs from those currently used in that a further VSB AM transmitter 12 generates a vestigial-sideband, binary phase-shift-keyed (VSB BPSK) suppressed carrier in quadrature phasing with the VSB AM video carrier for NTSC composite video signal. This further VSB AM transmitter 12 can include a balanced modulator, balanced both against carrier and against BPSK modulating signal, and can further include a 90°-phase-shift network receiving in-phase video carrier from the VSB AM transmitter 8 and supplying quadrature-phase video carrier to the balanced modulator. The VSB BPSK signal from the transmitter 12, like the VSB AM video carrier amplitude-modulated by NTSC composite video signal from the transmitter 8, is supplied to the multiplexer 5, there also to be frequency-multiplexed with the frequency-modulated (FM) sound carrier.

A source 13 of digital signal in parallel-bit form is supplied to an error-correction coder 14 which converts the digital signal into a serial-bit stream into which additional bits of forward error-correcting code are inserted. This serial-bit stream is supplied from the coder 14 to a rate buffer 15. Rate buffer 15 preferably functions as an interleaver, as will be described in more detail further on in this specification, with reference to FIG. 2. During every other data frame the rate buffer 15 writes a successive block of the forward error-corrected binary code to a frame repeater 16. The frame repeater 16 supplies each frame of data received as its input signal twice as its output signal. The output signal from the frame repeater 16 is supplied to circuitry 17 which one's complements the output signal from the frame repeater 16 on alternate data frames. The digital response from the circuitry 17 is supplied to a digital-to-analog converter (DAC) 18, for conversion to an analog keying signal. The DAC 18 supplies a high-frequency pre-emphasis and transition-shaping filter 19 with keying signal that is of a prescribed positive value responsive to a digital ZERO and is of a prescribed negative value responsive to a digital ONE. The prescribed negative level of analog modulating signal has the same absolute value as the prescribed positive level of analog modulating signal. The response of the filter 19 is a keying signal supplied to a balanced modulator in the transmitter 12, which balanced modulator also receives a quadrature-phase video carrier wave to be modulated. The transmitter 8 that supplies the VSB AM video carrier amplitude-modulated by NTSC composite video signal to the multiplexer 5 is carefully designed and operated so as to avoid incidental phase modulation that might interfere with the quadrature-phase VSB BPSK suppressed carrier from the transmitter 12. Since the quadrature-phase VSB AM carrier for PSK is suppressed, the phasing of the signal in which the VSB PSK and VSB AM carriers are combined is not appreciably different from that of the in-phase VSB AM video carrier. While FIG. 1 shows the transmitters 8 and 12 as being separate from each other, in practice the same upper sideband filters and final amplifier stages can be shared by the transmitters 8 and 12.

Figure 2:
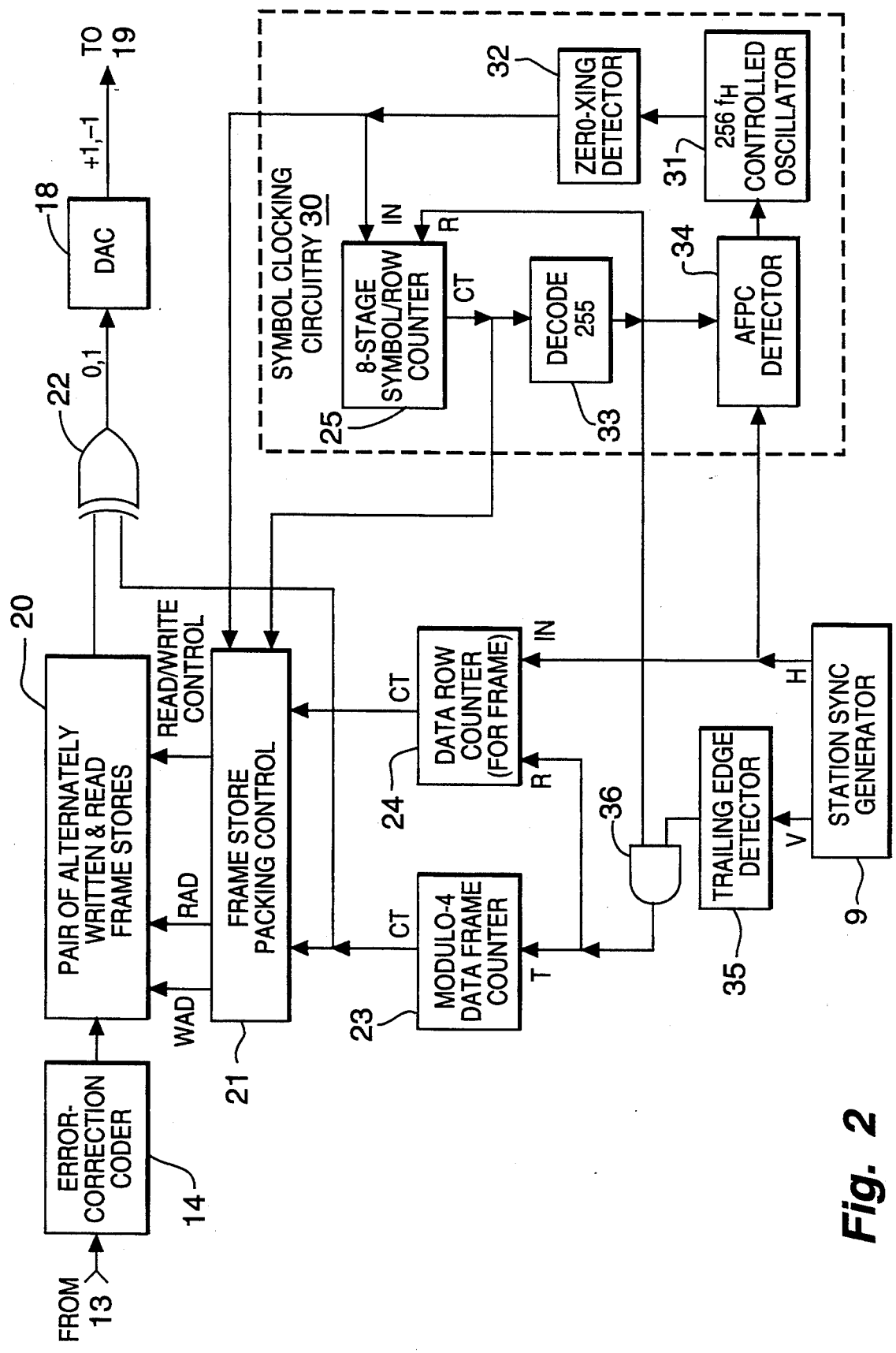
FIG. 2 is a schematic diagram showing in detail a portion of the FIG. 1 television transmitter used for processing the digital data from which the phase-shift keying signal is to be generated, which phase-shift keying signal modulates the suppressed, quadrature-phase video carrier.

FIG. 2 shows in more detail the construction of the portion of the TV transmitter 1 used for digitally filtering the digital data from which the phase-shift keying signal is to be generated. The error-correction coder 14 supplies digital signal in serial-bit form to a pair 20 of digital framestores that, under the control of framestore-packing-control circuitry 21, function as both the rate buffer 15 and the frame repeater 16. Preferably, the coder 14 is of a type generating modified Reed-Solomon codes; and the pair 20 of digital framestores perform further service as an interleaver. The addressing and operation of the pair 20 of digital framestores will be explained in more detail further on in this specification, with reference to FIG. 3 of the drawing.

Interleaver operation of the pair 20 of digital framestores places the original order of the scanning of data in columns, transverse to rows of data ultimately transmitted by the VSB BPSK data transmitter 12 simultaneously with respective horizontal scan lines of the composite video signal being transmitted by the VSB AM video transmitter 8. This is done so impulse noise and midband frequencies of composite video signal, which tend to have coherence in the horizontal direction, jam fewer bits of the modified Reed-Solomon codes than would be the case with modified Reed-Solomon codes operating on data mapped into rows along horizontal scan lines, rather than on data mapped into columns transverse to horizontal scan lines.

Data frames are defined as blocks of 525 rows of symbols which occur at a symbol rate that is a multiple of data row scan rate, which data row scan rate is the same as the horizontal scan line rate for analog composite video signal. BPSK symbols are bits, but the symbols to which the modified Reed-Solomon codes are applied are customarily $2^N$-bit data, N being a small positive integer such as three, four or five. The bit length over which each of the modified Reed-Solomon codes extends is chosen to be less than 525 (e.g., 256 or 512), so that impulse noise is less likely to disrupt any one of the modified Reed-Solomon codes more than once along its length. The relative phasing of the data rows and the horizontal scan lines of composite video signal is such that each data row as read from the pair 20 of digital framestores coincides in time with a respective horizontal scan line of composite video signal. Data frames are read from the pair 20 of digital framestores at the same rate as the frames of the analog composite video signal are supplied by the source 7, but it is convenient to have the data frames lag the video signal frames by nine horizontal scan lines of composite video signal for reasons disclosed further on in this specification.

Each of the pair 20 of digital framestores is read the first data frame following its being written and is re-read before re-writing in the second data frame following its being written, to generate output signal supplied as input signal to a first input of a two-input exclusive-OR gate 22 during respective frames of consecutive pairs of data frames. During the course of the pair of consecutive data frames one of the pair 20 of digital framestores is read and then re-read data row by data row, the other of the pair 20 of digital framestores is written. This writing is done data column by data column if the pair 20 of digital framestores is operated as an interleaver. A frame counter at the transmitter 1 is used to count eight-frame cycles for controlling the insertion of ghost-canceling reference signals into the composite video signals during selected vertical-blanking interval (VBI) scan lines. This frame counter includes among its stages a modulo-4 data frame counter 23 for supplying a MODULO-4 DATA FRAME COUNT signal used by the framestore-packing-control circuitry 21. The more significant bit of the MODULO-4 DATA FRAME COUNT signal is supplied by the packing-control circuitry 21 to the pair 20 of digital framestores for selecting which is to be written and which is to be read.

The less significant bit of the MODULO-4 DATA FRAME COUNT signal is a MODULO-2 DATA FRAME COUNT signal supplied from the counter 23 to the second input of the XOR gate 22. The logic ONE applied to the second input of the XOR gate 22 during the first reading of a frame of data from one of the pair 20 of digital framestores causes the XOR gate 22 to supply the DAC 18 the one's complements of the data read for the first time from the framestore memory to the first input of the XOR gate 22. The logic ZERO applied to the second input of the XOR gate 22 during the second reading of a frame of data from one of the pair 20 of digital framestores causes the XOR gate 22 to supply the DAC 18 a replica of the data read for the second time from the framestore memory to the first input of the XOR gate 22. The XOR gate 22 and the least-significant-bit stage of the counter 23 of FIG. 2 together comprise the circuitry 17 of FIG. 1, which circuitry 17 one's complements the output signal from the frame repeater 16 on alternate data frames.

In addition to receiving the MODULO-4 DATA FRAME COUNT signal from the counter 23, the packing-control circuitry 21 receives a DATA ROW COUNT signal from a data row counter 24 and a SYMBOL/ROW COUNT signal from a symbol counter 25. The packing-control circuitry 21 applies the DATA ROW COUNT as data row read addressing to the one of the pair 20 of digital framestores selected to be read from and applies the SYMBOL/ROW COUNT as within-row read addressing to that framestore selected to be read from. DATA ROW COUNT and SYMBOL/ROW COUNT together comprise the complete read addressing RAD FIG. 2 shows the packing-control circuitry 21 supplying to the pair 20 of digital framestores for application to the one selected for being read from. The packing-control circuitry 21 also generates write addressing WAD supplied to the one of the pair 20 of digital framestores selected for being written to.

FIG. 2 shows symbol clocking circuitry 30 that includes, in addition to the symbol-per-row counter 25, a voltage-controlled oscillator (VCO) 31, a zero-crossing detector 32, a 255-count decoder 33 and an automatic frequency and phase control (AFPC) detector 34. The symbol-per-row counter 25 comprises eight binary counting stages. The zero-crossing detector 32, which might be more properly termed an average-axis-crossing detector, generates a pulse whenever the sinusoidal oscillations of the oscillator 30 cross their average axis in a prescribed direction. The zero-crossing detector 32 customarily comprises a limiter amplifier that generates square waves responsive to the sinusoidal oscillations of the VCO 31, a differentiator for generating pulses responsive to transitions of these square waves, and a clipper for separating pulses of one polarity to be supplied to the framestore-packing-control circuitry 21 for timing purposes. These pulses are also supplied to the symbol-per-row counter 25 to be counted in each consecutive line, thereby to generate the SYMBOL/ROW COUNT signal supplied to the packing-control circuitry 21. The 255-count decoder 33 decodes the SYMBOL/ROW COUNT reaching 255 to generate a pulse. Instead of letting the SYMBOL/ROW COUNT simply roll over to arithmetic zero because full count is an integral power of two, each pulse from the 255-count decoder 33 can be used to reset the counter 25 on the next pulse supplied to the counter 25 by the zero-crossing detector 32, thus returning SYMBOL/ROW COUNT to arithmetic zero. The 255-count decoder 33 supplies pulses to the AFPC detector 34, to be compared with the horizontal sync pulses H to develop an AFPC voltage supplied to the VCO 31. This completes a negative feedback loop that adjusts the frequency of the VCO 31 oscillations to be 256 times the horizontal scan line frequency, or 4 027 972 Hz.

One way of synchronizing counting by the frame counter 23 and the data row counter 24 with the frames of analog composite video signal will now be considered. In a digital signal receiver for a system as described in this specification, it is preferable to synchronize the counter that regenerates DATA FRAME COUNT to the beginning of line 9 of each frame of the analog composite video signal, just after the trailing edge of the vertical sync pulse in the initial field of such frame. In such case, the counter that generates DATA ROW COUNT in the digital signal receiver is reset to prescribed count value at the beginning of line 9 of each frame of the analog composite video signal. The synchronizing of the counting by the modulo-2 data frame counter 23 and the data row counter 24 in the portion of the transmitter 1 shown in FIG. 2 conforms to the desired receiver practice.

The 255-count decoder 33 output signal is supplied as a first input signal to a two-input AND gate 36. The station sync generator supplies vertical sync pulses V to a trailing edge detector 36, which supplies pulses at the conclusions of lines 9 of composite video signal and at the midpoints of lines 271 of composite video signal output signal is supplied as a second input signal to the AND gate 35. The response of the AND gate 35 consists of DATA-FRAME-END pulses at the conclusions of lines 9 of composite video signal. Each of these DATA-FRAME-END pulses is applied as a trigger pulse to the modulo-2 data frame counter 23, so as to advance the DATA FRAME COUNT signal, and is also applied to the data row counter 24 to reset its DATA ROW COUNT to prescribed initial value. In practice, the 255-count decoder 33 may be dispensed with, and the carry pulses from the final binary counting stage of the symbol counter 25 may be supplied to the AFPC detector 34 and to the AND gate 35 instead of the decoder 33 output signal.

Figure 3:
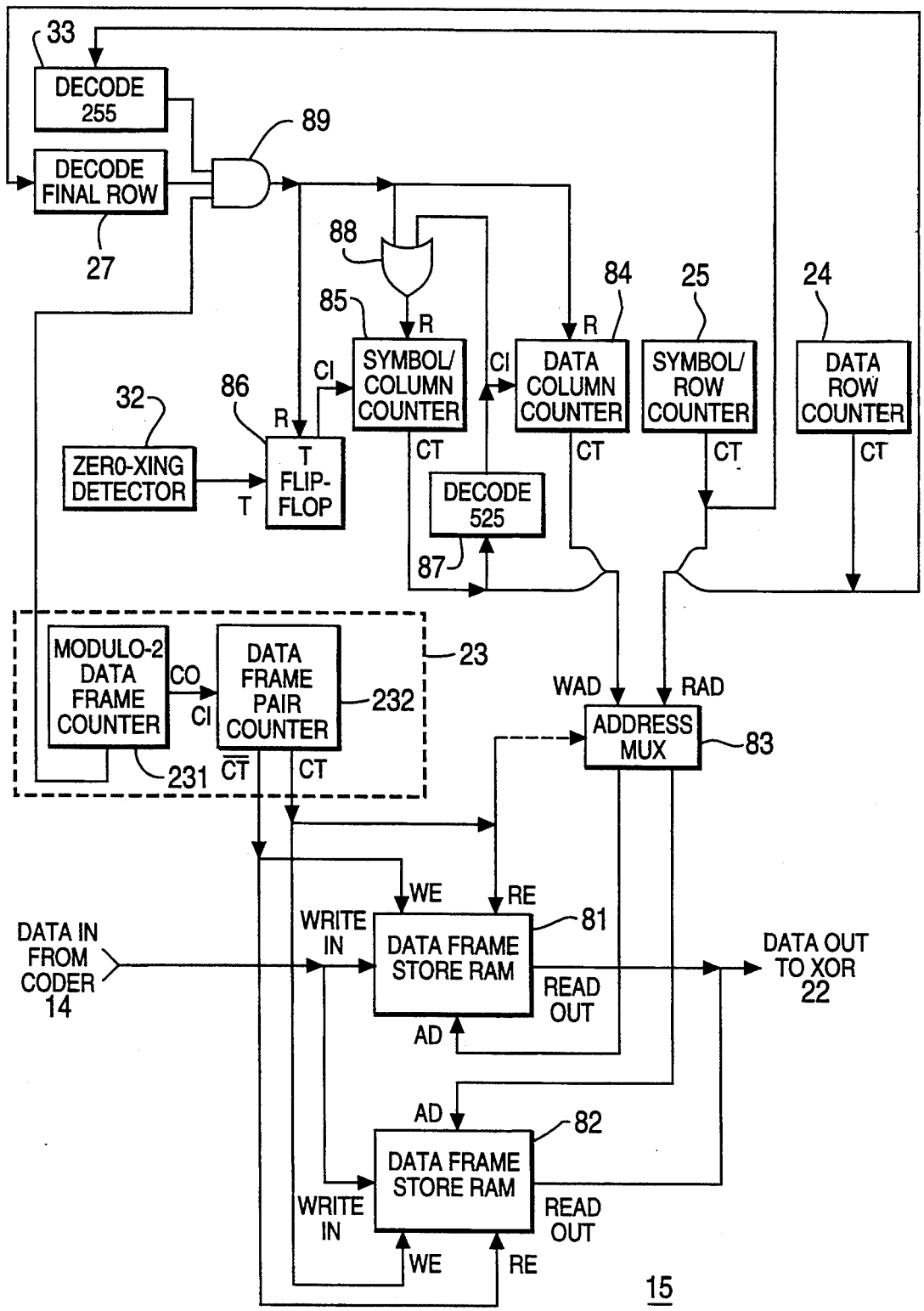
FIG. 3 is a schematic diagram of a rate buffer operated as an interleaver, which can be used in the portion of the FIG. 1 television transmitter shown in FIG. 2.

FIG. 3 shows specific connections for the pair 20 of digital framestores when they are to be operated as an interleaver for modified Reed-Solomon coding furnished from the error-correction coder 14. A data frame counter 23 includes a least-significant-bit counter stage 231 for generating MODULO-2 DATA FRAME COUNT and a next-to-least-significant-bit counter stage 232 for generating together with counter stage 231 MODULO-4 DATA FRAME COUNT. The next-to-least-significant-bit counter stage 232 controls the alternated writing and reading of two data framestore random access memories (RAMs) 81 and 82 that comprise the pair 20 of digital framestores. The RAMs 81 and 82 are written from the error-correction coder 14 at one-half PSK rate during alternate frame pair intervals, the address scanning being by column and by symbols per column. Each of the RAMs 81 and 82 is read to the XOR gate 22 at PSK rate in each frame pair interval following a frame pair interval in which it is written, the address scanning being by row and by symbols per row. The "symbols" per row referred to here are PSK symbols or bits, not the $2^N$-bit symbols associated with the modified Reed-Solomon codes considered from a coding standpoint.

An address multiplexer 83 receives DATA ROW COUNT from the data row counter 24 and SYMBOL/ROW COUNT from the symbol (i.e., symbol-per-row) counter 25 as read addressing. The address multiplexer 83 receives DATA COLUMN COUNT from a data column counter 84 and SYMBOL/COLUMN COUNT from a symbol-per-column counter 85 as write addressing. The zero-crossing detector 32 furnishes triggering pulses at PSK rate to a triggered flip-flop 86, which functions as a frequency divider for supplying alternate transitions of its output signal at one-half PSK rate to the symbol-per-column counter 85 as count input (Cl). A decoder 87 decodes the SYMBOL/COLUMN COUNT reaching full count (525 assuming symbol per column count starts at zero) to furnish a ONE as count input (Cl) signal for the data column counter 84. The decoder 87 output signal is supplied as a first input signal to a two-input RR gate 88, which OR gate 88 responds to a ONE from the decoder 87 to furnish a ONE as reset (R) signal to the symbol-per-column counter 85 for resetting the SYMBOL/COLUMN COUNT to its initial value.

The second input signal to the OR gate 88 and the reset (R) signal to the data column counter 84 are furnished by the output response from a 3-input AND gate 89, which response when it is ONE resets both the SYMBOL/COLUMN COUNT and the DATA COLUMN COUNT to their respective initial values. A decoder 27 supplies a logic ONE to a first input of the AND gate 89 when and only when the DATA ROW COUNT indicates that the final row of the data frame is reached; otherwise the decoder 27 supplies a logic ZERO as its output signal to the AND gate 89. The output signal from the final-symbol-of-the-data-row decoder 33 and the MODULO-2 DATA FRAME COUNT from the data frame counter 23 are applied to the AND gate 89 as the other two of its three input signals. The AND gate 89 output response is a ONE only when the final symbol of the final data row is reached in the odd frame, just before the even frame is reached, when a selected one of the RAMs 81 and 82 is to be read to the framestore memory 21 data row by data row.

The more significant bit of the MODULO-4 DATA FRAME COUNT supplied from the counter stage 232 being a ONE conditions the address multiplexer 83 to select read addressing to the RAM 81 and to select write addressing to the RAM 82. The more significant bit of the MODULO-4 DATA FRAME COUNT supplied from the counter stage 232 being a ONE enables the RAM 81 to be read data row by data row to the first input of the XOR gate 22, and the one's complement of that count being a ZERO enables the RAM 82 to be written data column by data column from the error-correction coder 14.

The more significant bit of the MODULO-4 DATA FRAME COUNT supplied from the counter stage 232 being a ZERO conditions the address multiplexer 83 to select read addressing to the RAM 82 and to select write addressing to the RAM 81. The more significant bit of the MODULO-4 DATA FRAME COUNT supplied from the counter stage 232 being a ZERO enables the RAM 82 to be read data row by data row to the first input of the XOR gate 22, and the one's complement of that count being a ONE enables the RAM 81 to be written data column by data column from the error-correction coder 14.

FIG. 4 shows a digital-signal receiver 40 for receiving, from means such as an antenna 42, a television signal with a digital signal buried therewithin and extracting the buried digital signal. A tuner 43 selects the television channel to be detected by the first detector therein, which first detector is a tunable downconverter, conventionally of superheterodyne type, for converting the selected television signal to a set of intermediate frequencies and an image set of frequencies. A video intermediate-frequency (IF) filter 44 selects the video intermediate frequencies for application as input signal to an intermediate-frequency (IF) amplifier 45 and rejects the image set of frequencies. Following the current custom a surface-acoustic-wave (SAW) filter can be used for the video IF filter 44 and to construct the video IF amplifier 45 within a monolithic integrated circuit (IC), as a multi-stage amplifier without interstage tuning. The video IF amplifier 45 supplies the amplified video IF signal to an in-phase synchronous video detector 46 and to a quadrature-phase synchronous video detector 47. An oscillator 48 oscillating with a nominal IF video carrier frequency of 45.75 MHz supplies its oscillations to the in-phase synchronous video detector 46 without phase shift and to a quadrature-phase synchronous video detector 47 with 90° lagging phase shift provided by a shift network 49. The oscillator 48 has automatic frequency and phase control (AFPC) responding to the output signal of the quadrature-phase synchronous video detector 47. The synchronous video detectors 46 and 47 are customarily included together with the video IF amplifier 45 and portions of the oscillator 48 within the IC. Each of the video detectors 46 and 47 may either be of exalted carrier type or of true synchronous type. In-phase modified composite video signal recovered by the in-phase synchronous video detector 46 is supplied to a horizontal sync separator 50 and to a vertical sync separator 51, which recover horizontal and vertical synchronizing pulses from the in-phase modified composite video signal, respectively.

The aspects of the digital-signal receiver 40 thusfar considered are generally familiar to persons skilled in the art of TV receiver design, although the video IF filter 44 is preferably made only about 3.5 MHz wide and is centered at about 45.25 MHz. This video IF filter 44 provides both in-channel and adjacent-channel sound rejection without need for sound trap filtering after the quadrature-phase video detector 47. This video IF filter 44 also suppresses chrominance components of the video signal detected by the in-phase video detector 46 and of the remnant composite video signal detected by the quadrature-phase video detector 47. The bandwidth of the quadrature-phase video detector 47 should be somewhat wider than symbol rate, so as not to attenuate the upper frequencies in the "tail" of BPSK response. The quadrature-phase video detector 47 detects the keying signal, accompanied by only those portions of the NTSC composite video signals at frequencies above 750 kHz.

In practice the digital signal receiver 40 usually will include ghost suppression circuitry, which is not separately and explicitly shown in FIG. 4, but can be of the type described in detail in U.S. patent application Ser. No. 08/108,311 filed 20 Aug. 1993 and in a U.S. patent application entitled APPARATUS FOR SUPPRESSING GHOSTS IN SIGNALS MODULATING A CARRIER IN QUADRATURE PHASING WITH A VIDEO CARRIER. The latter application is incorporated herein by reference and is filed concurrently herewith by C. B. Patel and J. Yang. Each of the in-phase and quadrature-phase video detectors 46 and 47 includes, after its synchronous detector per se, respective ghost cancellation and equalization filters similar to those used after the synchronous detector per se included in the other video detector. The adjustable parameters of the two ghost-cancellation filters are adjusted in parallel responsive to calculations made in a computer, and the adjustable parameters of the two equalization filters are also adjusted in parallel responsive to further calculations made in the computer. Ghost-cancellation reference (GCR) signals, which extend up to 4.1 MHz in frequency when transmitted, but extend to only 2.5 MHz or so in a digital signal receiver because of its limited IF bandwidth, are extracted from selected vertical-blanking-interval (VBI) scan lines of the video signal detected by the in-phase synchronous video detector 46. The GCR signals are digitized and supplied as input signal to the computer for calculating the adjustable parameters of the ghost-cancellation and equalization filters. Alternatively or additionally, direct-current or low-frequency components in the quadrature-phase video detector 47 response can be sensed and used as a basis for calculating the adjustable parameters of the ghost-cancellation filters.

In the FIG. 4 digital-signal receiver 40, a SAMPLE-PER-SYMBOL COUNT signal is generated by a sample-per-symbol counter 103 counting pulses generated by a zero-crossing detector 104 in response to sinusoidal oscillations received from a voltage-controlled oscillator 105. The sample-per-symbol counter 103 has four stages and supplies an overflow carry each sixteenth average-axis crossing of the oscillator 105 oscillations. A SYMBOL COUNT signal is generated by a symbol counter 52 counting overflow carries from the sample-per-symbol counter 103. A decoder 55 decodes the SYMBOL COUNT reaching 255 to generate a pulse that resets the counters 103 and 52 on the next pulse supplied to the counter 103 by the zero-crossing detector 104, returning both SAMPLE-PER-SYMBOL COUNT and SYMBOL COUNT to arithmetic zero. The pulses generated by the decoder 55 are supplied to an AFPC detector 56 to be compared to the horizontal sync pulses H separated by the horizontal sync separator 50 and adjustably delayed for fractions of a symbol interval by a controlled delay line 57. The results of the comparison are lowpass filtered within the AFPC detector 56 to generate an automatic frequency and phase control (AFPC) voltage signal for application to the VCO 105. These arrangements control the frequency of the oscillations supplied from the line-locked VCO 105 to be 16×256=4096 times the horizontal scan line frequency $f_H$, or 64 447 545 Hz. The term "line-locked" used in reference to a controlled oscillator means that the frequency of its oscillations is maintained in constant ratio to the 15,734.264 Hz scan line frequency, which is customarily done by AFPC circuitry comparing the frequency of its oscillations as divided by a suitable factor to horizontal synchronizing pulses.

The keying signal and accompanying portions of the NTSC composite video signals at frequencies above 750 kHz detected by the quadrature-phase video detector 47 are supplied to a match filter 58, which responds to the keying signal but only selected portions of the accompanying above-750-kHz frequency components of composite video signal. The match filter 58 provides a peaking response that matches with the roll-off of the transition-shaping portion of the filter 19 in the transmitter to extend PSK bandwidth enough to reduce inter-symbol interference. The match filter 58 can also provide further peaking response to compensate for the roll-off of the detection efficiency of the quadrature-phase video detector 47 attributable to the VSB BPSK becoming increasingly single sideband in nature over the frequency range extending between 0.75 and 1.25 MHz and being substantially single sideband in nature over the frequency range extending upward from 1.25 MHz. However, since the vestigial sideband filters of different TV transmitters exhibit variations from each other, the peaking response to compensate for the roll-off of the detection efficiency of the quadrature-phase video detector 47 is probably better done at each TV transmitter 1, by modifying the transition shaping filter 19 to provide the appropriate peaking response in addition to shaping transitions. This additional peaking or pre-emphasis of binary keying signal at the transmitter 1 will, however increase the high frequency content of the BPSK above 0.75 MHz that is transmitted together with luminance signal.

The response from the match filter 58 is applied as input signal to an analog-to-digital converter (ADC) 106. The quadrature-phase video detector 47 recovers substantially no composite video signal frequencies below 750 kHz and the BPSK coding is such that it has no zero-frequency content. During the transmission of TV images without much energy in the frequencies above 750 kHz, the BPSK portion of the quadrature-phase synchronous video detector 47 response will alternate from one polarity to the other. So the ADC 106 is of a type capable of digitizing analog signal of either positive or negative polarity. More particularly, the ADC 106 is preferably a multi-bit sigma-delta converter with single-bit feedback, as described by T. C. Leslie and B. Singh in their paper "An Improved Sigma-Delta Modulator Architecture". A flash converter with 8-bit resolution (which is of modest price) samples the error signal in a second-order sigma-delta feedback loop, and single-bit feedback is used to minimize digital-to-analog conversion errors. The second-order sigma-delta feedback loop is unconditionally stable. The error signal is sampled at sixteen times the symbol rate of 256 times horizontal scan line rate $f_H$ for an 16:1 oversampling ratio, sampling each time a pulse is received over a line 107 from the zero-crossing detector 104 each time it detects a zero crossing of oscillations from the oscillator 105. The digital output of the flash converter is supplied to an FIR lowpass filter within the converter 106, and the digital response of this filter is subsampled 16:1 by a subsampler sampling each time a pulse is received over a line 108 from the carry overflow of the sample-per-symbol counter 103. This decimation reduces the amount of storage capability required in the delay portions of the digital comb-filtering to follow. Subsampling at symbol rate, with optimal phasing, is a form of synchronous symbol detection which suppresses response to those components of the composite video signal that exhibit change at symbol rate, but are in quadrature phasing with the sampling at symbol rate.

A single-bit ADC 109, sampling at eight times the symbol rate of 256 times horizontal scan line rate $f_H$ responsive to pulses supplied by the zero-crossing detector 104 on the line 108, responds to the match filter 58 response to supply a sign bit descriptive of the polarity of the match filter 58 response. That sign bit and that sign bit as delayed one sample in a bit latch 110 are supplied as respective inputs to an exclusive-OR gate 111. The XOR gate 111 detects match filter 58 response, supplying the results of this detection to a pulse phase discriminator 67. The pulse phase discriminator 67 selectively detects departures of the zero-crossings of the match filter 58 response, as detected by the XOR gate 110, from proper phasing respective to the zero-crossings of the oscillations of the controlled oscillator 105, as detected by the zero-crossing detector 104. The pulse phase discriminator 67 lowpass filters these selectively detected departures, as sampled and held, thereby to generate a control signal for adjusting the delay the controlled delay line 57 provides for the horizontal sync pulses H applied to the AFPC detector 56. This selective detection by the pulse phase discriminator 67 can be done during portions of the vertical blanking interval when the response of quadrature-phase video detector 47 to composite video signals is expected to be zero-valued. The phasing of the oversampling by the flash converter in the ADC 107 during its digitization of second-order sigma-delta error signal is accordingly adjusted for minimal inter-symbol interference.

The arrangements for adjusting the phasing of the line-locked oscillator are of the type developed by Jung-Wan Ko, a co-worker with the inventors. The AFPC loop controlling the frequency and phasing of the oscillations of the controlled oscillator 105 with respect to the adjustably delayed horizontal sync pulses H supplied from the controlled delay line 57 provides a filtering function that avoids the ADC clocking exhibiting a "glitch" or pronounced shortening of periodicity during phase adjustment. Such glitches occur at times if fine phase adjustment is attempted in the ADC clocking itself.

The vertical sync separator 51 supplies "lossy" integrated response to separated vertical sync pulses V to a threshold detector 68, the threshold voltage of which is chosen such that it is exceeded only when the vertical sync pulses are integrated over more than five-and-a-half scan lines and less than six-and-a-half scan lines. The threshold detector 68 output signal, which is a ONE only when its input signal exceeds its threshold voltage and is otherwise a ZERO is supplied as a first input signal to a two-input AND gate 69. The decoder 55, which generates a ONE for the final value of SYMBOL COUNT in each data row (at the finishes of horizontal scan lines) and otherwise generates a ZERO, supplies its output signal to the AND gate 69 as a second input signal thereto. The AND gate 69 is responsive to the trailing edges of vertical pulses that occur at the beginning of the initial fields of composite video signal frames, to provide a respective DATA-FRAME-END pulse responsive to each of these edges, but is not responsive to the trailing edges of vertical pulses that occur between respective initial and final fields of frames. The DATA-FRAME-END pulses in the AND gate 69 response are supplied to a modulo-64 data frame counter 70 as count input (CI) signal, so as to advance a regenerated DATA FRAME COUNT signal, which is offset by one scan line from the DATA FRAME COUNT signal at the transmitter. A frame synchronizer 71 for resetting the data frame counter 70 will be described in detail further on in this specification, with reference to FIG. 11 of the drawing.

The DATA-FRAME-END pulses in the AND gate 69 response are also applied as a reset (R) signal to a data row counter 72 to reset the DATA ROW COUNT regenerated as its output signal, which should then be 524, to arithmetic zero. The data row counter 72 is connected to count the horizontal sync pulses H supplied from the horizontal sync separator 50. The DATA ROW COUNT is used to control the selection of the VBI scan lines containing GCR signals in the circuitry (not explicitly shown in FIG. 4) for acquiring data for the computer (also not explicitly shown in FIG. 4) that calculates the adjustable filtering parameters for the equalization and ghost-cancellation filters included within the video detectors 46 and 47.

A data separation filter 73 receives the subsampled digital response of the sigma-delta analog-to-digital converter 106 as input signal. Particular embodiments of the data separation filter 73 will be described further on in this specification with reference to FIGS. 6 and 7 of the drawing. If the data separation filter 73 is one of the types shown in FIGS. 6 and 7, it supplies every other data frame valid separated data samples to ensuing symbol decision circuitry 75. These valid separated data samples are in 5-level form, rather than in binary form. The symbol stream from the symbol decision circuitry 75 is supplied as input signal to a post-line-comb partial-response filter 76. The partial response filter 76 operates in the digital domain to undo what has been done to the digital information in the analog domain by the comb filtering in the data separation filter 73.

The symbol stream from the partial-response filter 76 is supplied as input signal to a rate buffer 77, which is conditioned by the least significant bit of the DATA FRAME COUNT to write different ones of two frame stores therewithin on alternate data frames and to read the one of these of two frame stores not selected for writing. Digital samples are supplied from the rate buffer 77 to an error-correction decoder 78. In preferred embodiments of the digital signal receiver 40, designed to be used with a transmitter 1 using modified Reed-Solomon codes operating on columns of data transverse to horizontal scan lines, rather than on rows of data along horizontal scan lines, the rate buffer 77 is operated as a de-interleaver for the error-correction decoder 78. Decoder 78 converts its serial-bit digital input data to parallel-bit form and corrects the errors therein to provide corrected digital data, which are the output data of the digital signal receiver 40.

Figure 5:
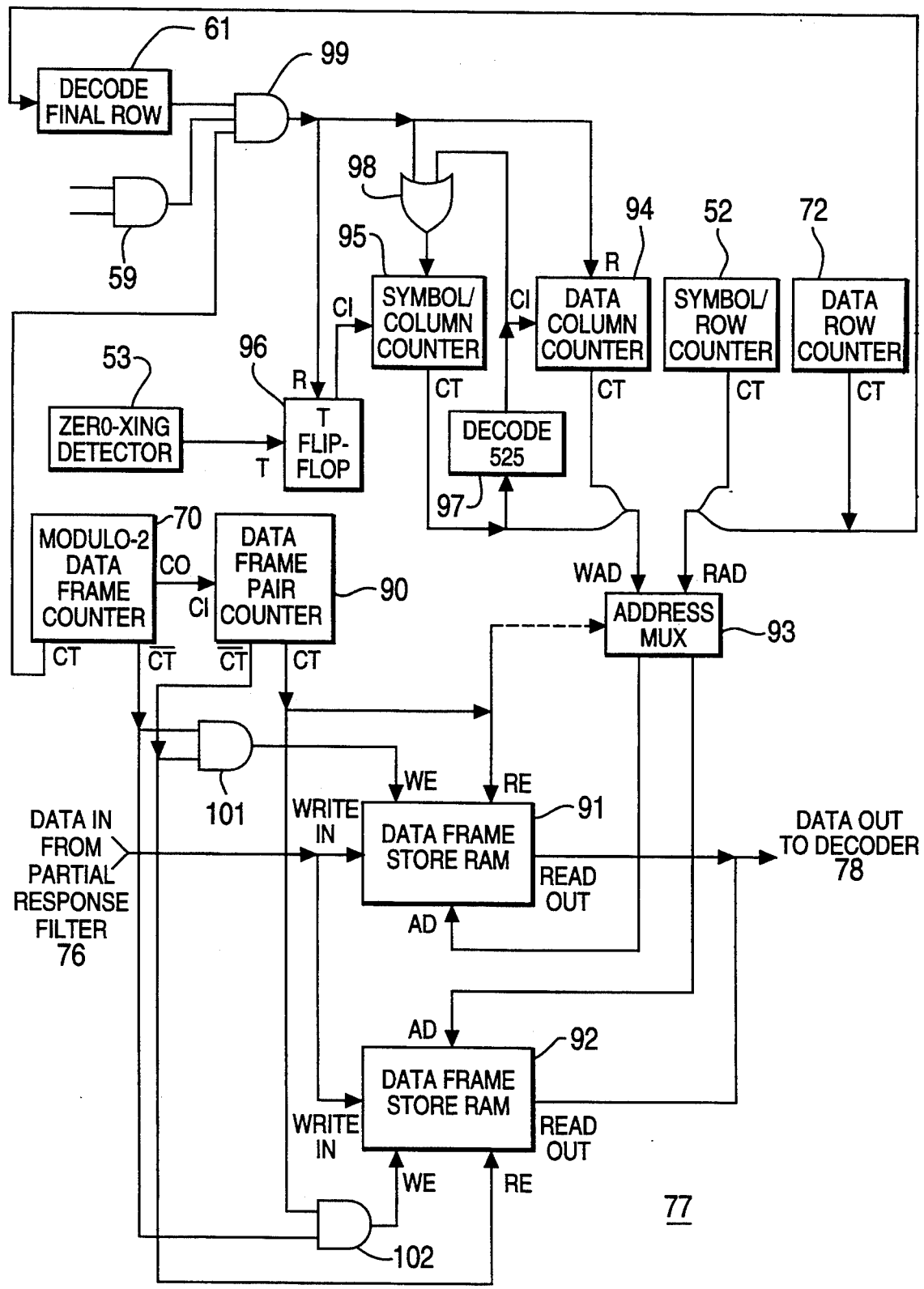
FIG. 5 is a schematic diagram of a rate buffer operated as a de-interleaver, which can be used in the digital-signal receiver circuitry of FIG. 4.

FIG. 5 shows a form that the rate buffer 77 shown in FIG. 4 can take when it is to be used as a de-interleaver for modified Reed-Solomon coding furnished from the partial-response filter 76. A data frame pair counter 90 receives as its count input (CI) signal a carry out (CO) signal supplied from the data frame counter 70. The data frame pair counter 90 controls the alternated writing and reading of two data framestore random access memories 91 and 92 operated as a de-interleaver for error-correction coding. The RAMs 91 and 92 are written only during alternate even frames, the data for writing the RAMs 91 and 92 being supplied from the partial-response filter 76 at PSK rate, the address scanning being by row and by symbols per row. The "symbols" per row referred to here are PSK symbols or bits, not the $2^N$-bit symbols associated with the modified Reed-Solomon codes considered from a coding standpoint. Each of the RAMs 91 and 92 is read to the framestore memory 21 at one-half PSK rate during alternate frame pair intervals, the address scanning being by column and by symbols per column.

An address multiplexer 93 receives DATA ROW COUNT from the data row counter 72 and SYMBOL/ROW COUNT from the symbol (i.e., symbol-per-row) counter 52 as write addressing. The address multiplexer 93 receives DATA COLUMN COUNT from a data column counter 94 and SYMBOL/COLUMN COUNT from a symbol-per-column counter 95 as read addressing. The zero-crossing detector 53 furnishes triggering pulses at PSK rate to a triggered flip-flop 96, which functions as a frequency divider for supplying alternate transitions of its output signal at one-half PSK rate to the symbol-per-column counter 95 as count input (CI). A decoder 97 decodes the SYMBOL/COLUMN COUNT reaching full count (525 assuming symbol per column count starts at zero) to furnish a ONE as count input (CI) signal for the data column counter 94. The decoder 97 output signal is supplied as a first input signal to a two-input OR gate 98, which OR gate 98 responds to a ONE from the decoder 97 to furnish a ONE as reset (R) signal to the symbol-per-column counter 95 for resetting the SYMBOL/COLUMN COUNT to its initial value.

The second input signal to the OR gate 98 and the reset (R) signal to the data column counter 94 are furnished by the output response from a 3-input AND gate 99, which response when it is ONE resets both the SYMBOL/COLUMN COUNT and the DATA COLUMN COUNT to their respective initial values. The decoder 61 supplies a logic ONE to a first input of the AND gate 99 when and only when the DATA ROW COUNT indicates that the final row of the data frame is reached; otherwise the decoder 61 supplies a logic ZERO as its output signal to the AND gate 99. The output signal from the final-symbol-of-the-data-row decoder 55 and the MODULO-2 DATA FRAME COUNT from the data frame counter 70 are applied to the AND gate 98 as the other two of its three input signals. The AND gate 98 output response is a ONE only when the final symbol of the final data row is reached in the odd frame, just before the even frame is reached when a selected one of the RAMs 91 and 92 is to be written data row by data row from the symbol decision circuitry 75 or 76.

Modulo-2 DATA FRAME PAIR COUNT from the data frame pair counter 90 being a ONE conditions the address multiplexer 93 to select read addressing to the RAM 91 and to select write addressing to the RAM 92. DATA FRAME PAIR COUNT from the data frame pair counter 90 being a ONE enables the RAM 91 to be read data column by data column to the error-correction decoder 78. A two-input AND gate 101 selectively supplies a ONE as write enable (WE) signal to the RAM 92, responsive to the one's complements of the DATA FRAME COUNT and the DATA FRAME PAIR COUNT from the counters 70 and 90 both being ZEROs. This WE signal enables the RAM 92 to be written data row by data row from the symbol decision circuitry 75 or 76.

Modulo-2 DATA FRAME PAIR COUNT from the data frame pair counter 90 being a ZERO conditions the address multiplexer 93 to select read addressing to the RAM 92 and to select write addressing to the RAM 91. DATA FRAME PAIR COUNT from the data frame pair counter 90 being a ZERO enables the RAM 92 to be read data column by data column to the error-correction decoder 78. A two-input AND gate 102 selectively supplies a ONE as write enable (WE) signal to the RAM 91, responsive to the one's complement of the DATA FRAME COUNT being a ZERO and the DATA FRAME PAIR COUNT from the counter 90 being a ONE. This WE signal enables the RAM 91 to be written data row by data row from the symbol decision circuitry 75 or 76.

The rate buffering, done in the digital signal receiver 40 so as to fill the gap left when alternate frames of non-valid data arising from the frame-comb filtering of paired frames are discarded, can take place after the data separation filtering, but before the symbol decision circuitry. Rate buffering is preferably done after symbol decision, however, since then the framestore memory need only be one-bit deep, rather than many bits deep. Doing rate buffering together with de-interleaving before error-correction decoding is preferable, since it avoids the need for a separate framestore memory for rate buffering. Where rate buffering is done separately from de-interleaving, the rate buffering can be done with just one framestore memory, if it is a dual-ported RAM having a read-only port supplied by a shift register the serial stages of which can be loaded in parallel a row at a time from the RAM portion accessed through a read/write port.

Figure 6:
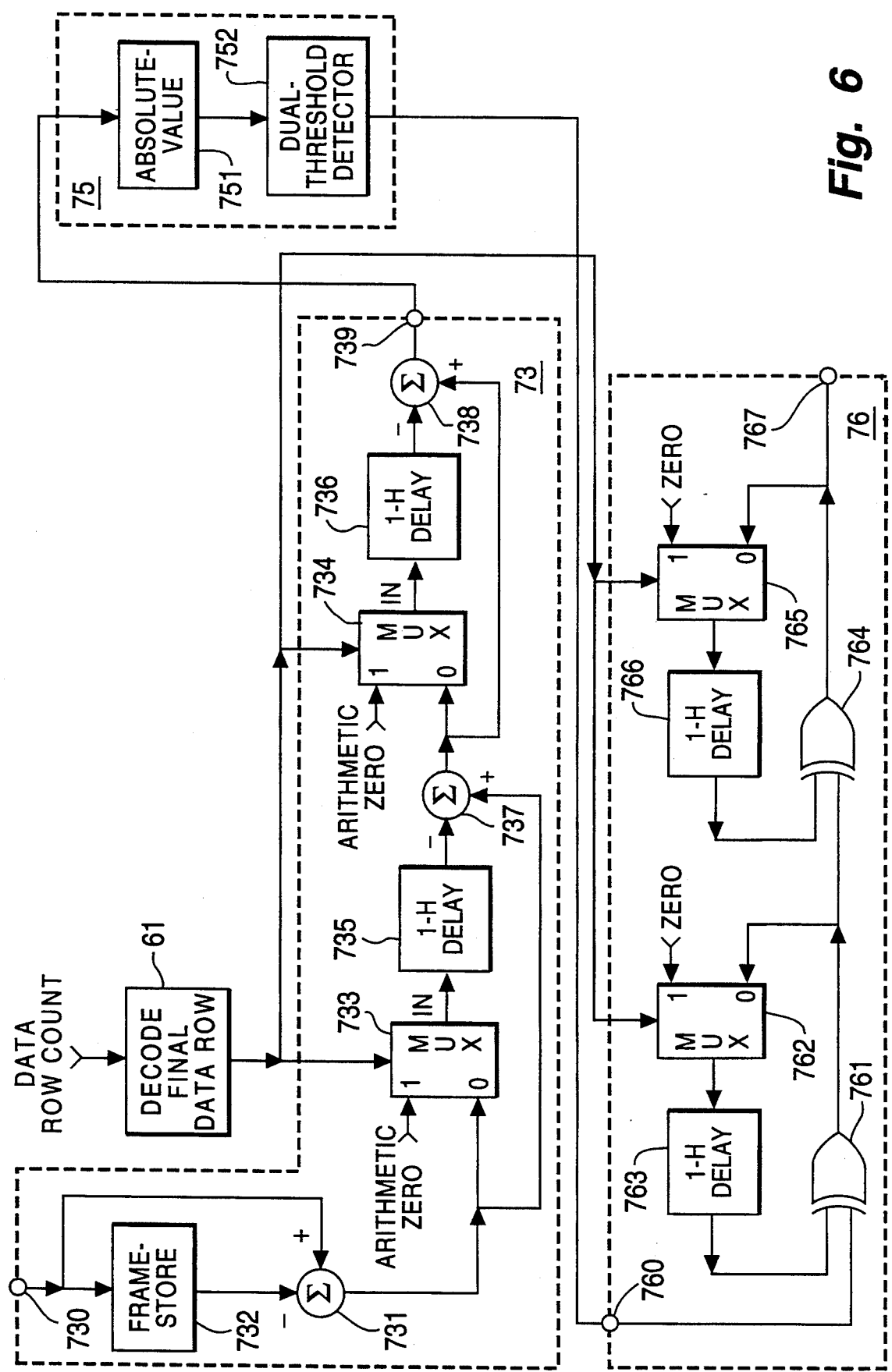

FIG. 6 shows one form that can be taken by the portion of the digital signal receiver 40 comprising the data separation filter 73, the decision circuitry 75 and the partial-response filter 76. An input terminal 730 of the filter 73 receives digital samples from the ADC 106 for application to the minuend input of a digital subtractor 731 and to the input of a digital framestore 732. Digital samples read from the output of the digital framestore 732 are applied as the subtrahend input of the digital subtractor 731. The framestore 732 can be a RAM operated in a read-and-then-write-over mode, which RAM is addressed by a DATA ROW COUNT supplied from the counter 72 applied as row address and the SYMBOL PER DATA ROW COUNT from the counter 52 applied as column address. The samples stored at each addressable storage location in the digital framestore 732 typically have at least twelve bits in them.

The subtractor 731 and the framestore 732 together form a highpass frame-comb filter, supplying at the output of the subtractor 731 a highpass frame-comb filter response to the digital samples received at the input terminal 730 of the data separation filter 73. The highpass frame-comb filter response from the output of the subtractor 731, in which response luma components descriptive of static image are suppressed, is supplied to a highpass line-comb filter that comprises elements 733-738 and suppresses luma components descriptive of moving image in its response supplied at the output terminal 739 of the data separation filter 73. Luma components are suppressed in the response supplied at the output terminal 739, which is primarily constituted of highpass comb-filtered digital signal samples of 5-level form.

The decoder 61, which responds to DATA ROW COUNT, generates a logic ONE as output signal when the DATA ROW COUNT indicates that the final row of the data frame has been reached and generates a logic ZERO as output signal at all other times. The output signal of the decoder 61 is supplied as control signal to multiplexers 733 and 734, each of which multiplexers has a respective first input receptive of wired arithmetic zero and has a respective second input. The multiplexers 733 and 734 have respective outputs respectively connected to the respective inputs of 1-H digital delay lines 735 and 736. The output signal of a 1-H delay line reproduces the input signal applied thereto after a delay equal to the duration of a horizontal scanning line of the composite video signal (63.5 microseconds). The 1-H delay lines 735 and 736 can be constructed from respective RAMs addressed by the SYMBOL PER ROW COUNT (SAD) from the symbol counter 52 and operated in a read-then-write-over mode. The logic ONE furnished as output signal from the decoder 61 during the final row of each data frame conditions the multiplexers 733 and 734 to write a respective row of arithmetic-zero samples into each of the 1-H delay lines 735 and 736. Consequently, rows of arithmetic-zero samples are read from the 1-H delay lines 735 and 738 during the initial row of each data frame, which is done so that a post-line-comb partial-response filter portion of the partial-response filter 78 can be appropriately reset. This resetting will be described in more detail further on in this specification, with reference to FIG. 8 of the drawing.

A logic ZERO is furnished as output signal from the decoder 61 during normal operation of the highpass line-comb filter that comprises elements 733-738. Responsive to the logic ZERO supplied as a control signal from the decoder 61, the multiplexer 733 replicates, in its output signal supplied to the input of the 1-H digital delay line 735, the highpass frame-comb filter response applied to the second input of the multiplexer 733 from the output of the subtractor 731. Responsive to the logic ZERO supplied as a control signal from the decoder 61, the multiplexer 734 replicates, in its output signal supplied to the input of the 1-H digital delay line 738 the difference output signal from a digital subtractor 737. The subtractor 737 combines the highpass frame-comb filter response and that response as delayed by the duration of one horizontal scan line; and a digital subtractor 738 combines the difference output signal from the subtractor 737 and that difference output signal as delayed by the duration of one horizontal scan line, thereby to generate at the output terminal 739 a highpass line-comb filter response to the highpass frame-comb filter response from the output of the subtractor 731.

The comb filtering in each of the data separation filter 73 converts the BPSK signal to 5-level digital information, rather than leaving it in binary form. Symbol decision circuitry 75 in such case has five comparator ranges respectively centered on $-2$, $-1$, $0$, $+1$, and $+2$. Symbol decision circuitry 75 includes an absolute-value circuit 751, which generates a rectified digital response to the output signal from the data separation filter 73. The rectified digital response of the absolute-value circuit 751 is descriptive of ternary (or 3-level) keying signal superposed on a direct-voltage pedestal, rather than being descriptive of binary coding of keying signal, so this rectified digital response is supplied to a double-threshold detector 752. The double-threshold threshold detector 752 receives the symbol stream from absolute-value circuit 751 and makes a decision as to whether the symbol is most likely a ZERO, is most likely a ONE, or is most likely a TWO, TWOs being equated to ZEROs. The double-threshold threshold detector 752 typically contains two digital comparators (each arranged to operate as single-threshold detector, the second of these single-threshold detectors being operated at a threshold digital value twice as large as the threshold digital value the first of them is operated at) and some simple logic circuitry for deciding the identity of the symbol depending on the threshold detection results. If neither of the threshold digital values is exceeded, or if both of the threshold digital values is exceeded, the logic circuitry indicates that the symbol is most likely a ZERO. If only the lower threshold digital value is exceeded, the logic circuitry indicates that the symbol is most likely a ONE. The double-threshold threshold detector 752 is preferably of a type in which the digital values supplied to the comparators for determining the thresholds for threshold detection are automatically adjusted responsive to symbol strength. In such case, the double-threshold threshold detector 752 has associated circuitry for detecting the average level of the symbol stream supplied by absolute-value circuit 751, or its average peak level, or both. There is circuitry for reckoning from each level detected the digital values supplied to the digital comparators to establish their respective thresholds for threshold detection. The detection procedures for determining symbol decision thresholds preferably are selectively implemented during the vertical blanking intervals, when the composite video signal contributes almost no energy to the signal detected by the quadrature-phase video detector 47.

The bit-serial signal from the double-threshold threshold detector 752 is applied via an input terminal 760 of the partial-response filter 76 to a first input of a two-input exclusive-OR (XOR) gate 761. A two-input multiplexer 762 has a first input to which a wired ZERO is applied, has a second input to which the response of the XOR gate 761 is applied, and has an output connected to the input of a 1-H digital delay line 763. The digital delay line 763 supplies at its output connection to the second input of the XOR gate 761 a response to the output signal from the multiplexer 762 delayed by the duration of one horizontal scan line. The elements 761, 762 and 763 provide an initial section of a post-line-comb partial-response filter, shown in FIG. 8 as having a final section including elements 764, 765 and 766. The two-input exclusive-OR gate 764 has a first input to which the output of XOR gate 761 is connected for applying the response of the initial section of the pre-line-comb partial-response filtering. A two-input multiplexer 765 has a first input to which a wired ZERO is applied, has a second input to which the response of the XOR gate 764 is applied, and has an output connected to the input of a 1-H digital delay line 766. The digital delay line 766 supplies at its output connection to the second input of the XOR gate 763 a response to the output signal from the multiplexer 765 delayed by the duration of one horizontal scan line. Each of the multiplexers 762 and 765 receives the output signal from the decoder 61 as its control signal.

The output signal of the decoder 61 is a ONE only during the final row of each data frame, conditioning the multiplexers 733 and 734 to load arithmetic-zero samples into the 1-H digital delay lines 735 and 736 in the data separation filter 73, and conditioning the multiplexers 762 and 765 in the partial-response filter 76 to load logic-ZERO samples into the 1-H digital delay lines 763 and 766. These procedures allow the contents of the 1-H digital delay lines 763 and 766 in the post-line-comb partial-response filter to be periodically initialized, in synchronization with the initialization of the contents of the 1-H digital delay lines 735 and 736 in the highpass line-comb filter portions of the data separation filter 73. Since this periodic initialization is done during the vertical blanking interval, there are no appreciable remnants of the NTSC video signal to act as a jamming signal. This is so even during the horizontal blanking interval, since the data frames begin and end during scan lines when color burst is not transmitted, and since the quadrature-phase video detector 47 suppresses remnants of the NTSC video signal below 750 kHz at all times eliminating synchronizing and equalizing pulses as jamming signal.

The response of the final section of the post-line-comb partial-response filter comprising the elements 761–766 appears at the output of the XOR gate 764 and is applied to the output terminal 767 of the partial response filter 76. Because of the data frames being repeated, there is no need for a post-frame-comb partial response filter.

Figure 7:
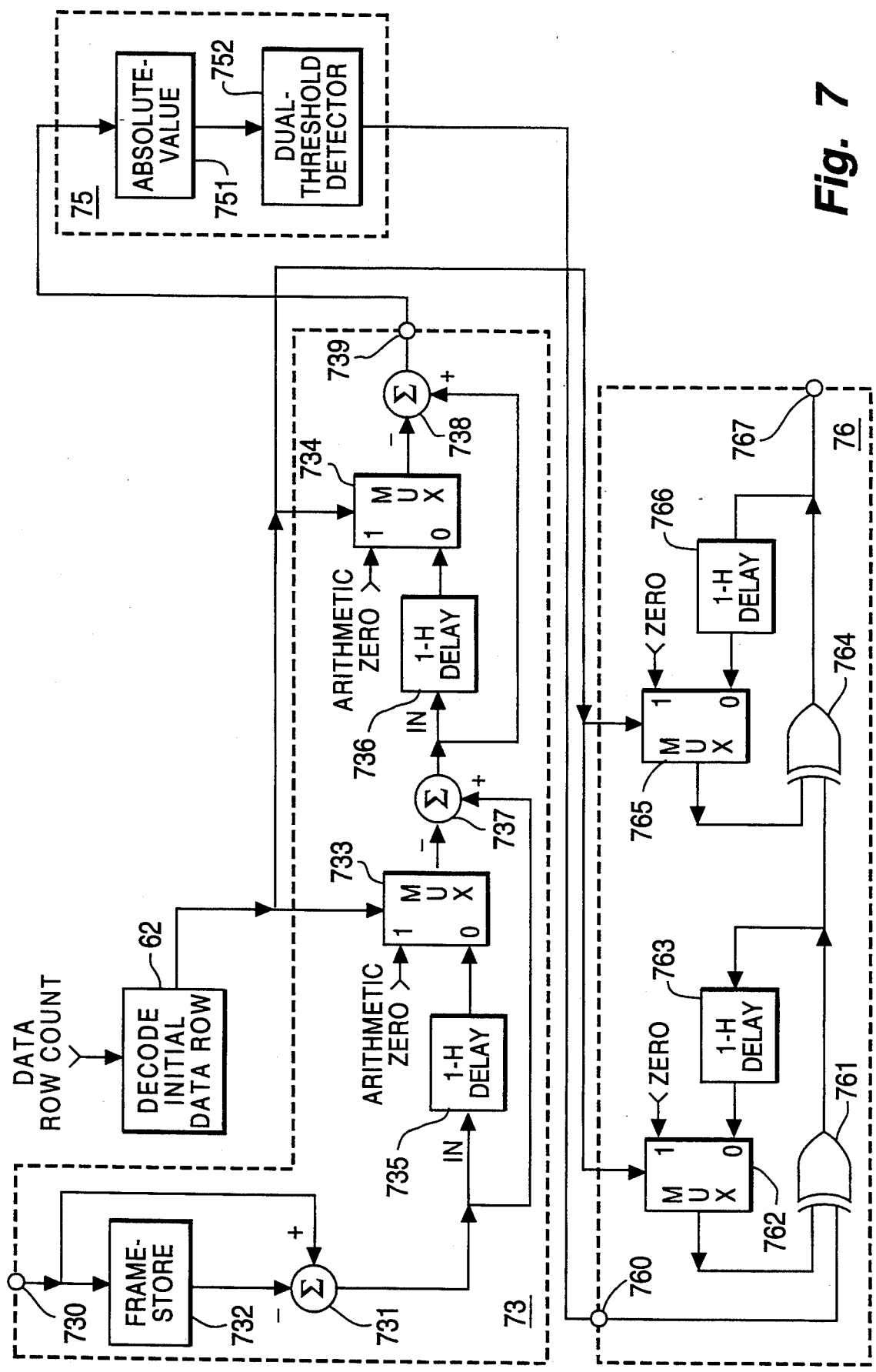

FIG. 7 shows another form that can be taken by the portion of the digital signal receiver 40 comprising the data separation filter 73, the symbol decision circuitry 75 and the partial-response filter 76, which form differs from that of FIG. 6 in that the two-input multiplexers 733, 734, 762 and 765 are repositioned for affecting reading from the 1-H delays 735, 736, 763 and 766, rather than affecting their writing. The first inputs of the multiplexers 733 and 734 receive respective wired arithmetic-zero input signals, which those multiplexers are conditioned to replicate at their respective outputs responsive to a decoder 62 supplying them a logic ONE as a control signal. The first inputs of the multiplexers 762 and 765 receive respective wired logic-ZERO input signals, which those multiplexers are conditioned to replicate at their respective outputs responsive to a decoder 62 supplying them a logic ONE as a control signal. The decoder 62 generates a logic ONE when and only when the DATA ROW COUNT signal is indicative of the initial row of a data frame being reached. Otherwise, the decoder 62 generates a logic ZERO as a control signal for the multiplexers 733, 734, 762 and 765, conditioning them to replicate at their respective outputs the signals applied to their respective second inputs. The 1-H delays 735, 736, 763 and 766 have their outputs connected to the second inputs of the multiplexers 733, 734, 762 and 765, respectively, and respond after a delay of duration equal to that of a horizontal scan line to signals applied to their respective inputs from the respective outputs of the subtractor 731, the subtractor 737, the XOR gate 761 and the XOR gate 764, respectively. The outputs of the multiplexers 733, 734, 762 and 765 connect to the minuend input of the subtractor 737, the minuend input of the subtractor 738, the second input of the XOR gate 761, and the second input of the XOR gate 764, respectively.

Figure 8:
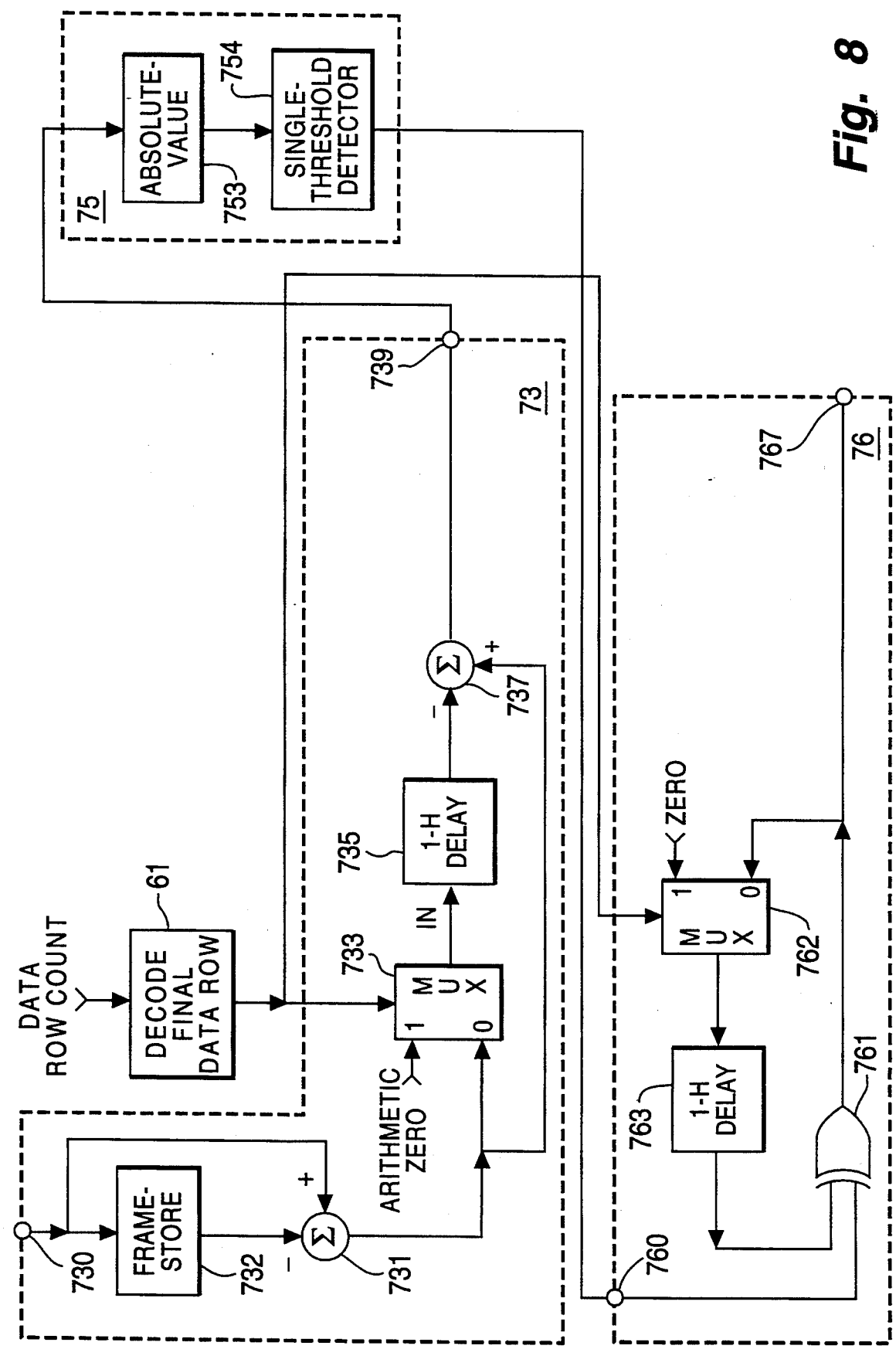

FIG. 8 shows still another form that can be taken by the portion of the digital signal receiver 40 comprising the data separation filter 73, the symbol decision circuitry 75 and the partial-response filter 76, which form differs from that of FIG. 6 in that the line-comb filtering in the data separation filter 73 is done over two horizontal scan lines, rather than three. Accordingly, the elements 734, 736 and 738 in the data separation filter 73 are dispensed with, and the difference output signal from the digital subtractor 737 is applied to the output terminal 739 of the data separation filter 73. The digital signal in this output signal is ternary or three-level in nature, rather than five-level in nature.

Therefore, the decision circuitry 75 is modified in FIG. 8 so that an absolute-value circuit 753 responds to the input signal to the decision circuitry 75, and so that the absolute-value response is supplied to a single-threshold threshold detector 754, which makes a decision as to whether each symbol is most likely a ZERO or is most likely a ONE. The single-threshold threshold detector 754 typically contains one digital comparator for comparing the output signal from the absolute-value circuit 753 against a single threshold digital value. If the threshold digital value is not exceeded, the threshold detector 754 indicates that the symbol is most likely a ZERO. If the threshold digital value is exceeded, the threshold detector 754 indicates that the symbol is most likely a ONE. The threshold detector 754 is preferably of a type in which the digital value supplied to the comparator for determining the threshold level for threshold detection is automatically adjusted responsive to symbol strength. In such case, the threshold detector 754 has associated circuitry for detecting the average level of the symbol stream supplied by the absolute-value circuit 753, or its average peak level, or both. There is circuitry for reckoning from each level detected the digital value supplied to the digital comparator to establish its threshold level for threshold detection. The detection procedure for determining the symbol decision threshold preferably is selectively implemented during the vertical blanking intervals, when the composite video signal contributes almost no energy to the signal detected by the quadrature-phase video detector 47.

FIG. 8 also shows the partial-response filter 76 being modified. The elements 764–766 are dispensed with, and the output connection of the XOR gate 761 is to the output terminal 767 of the partial-response filter 76.

Figure 9:
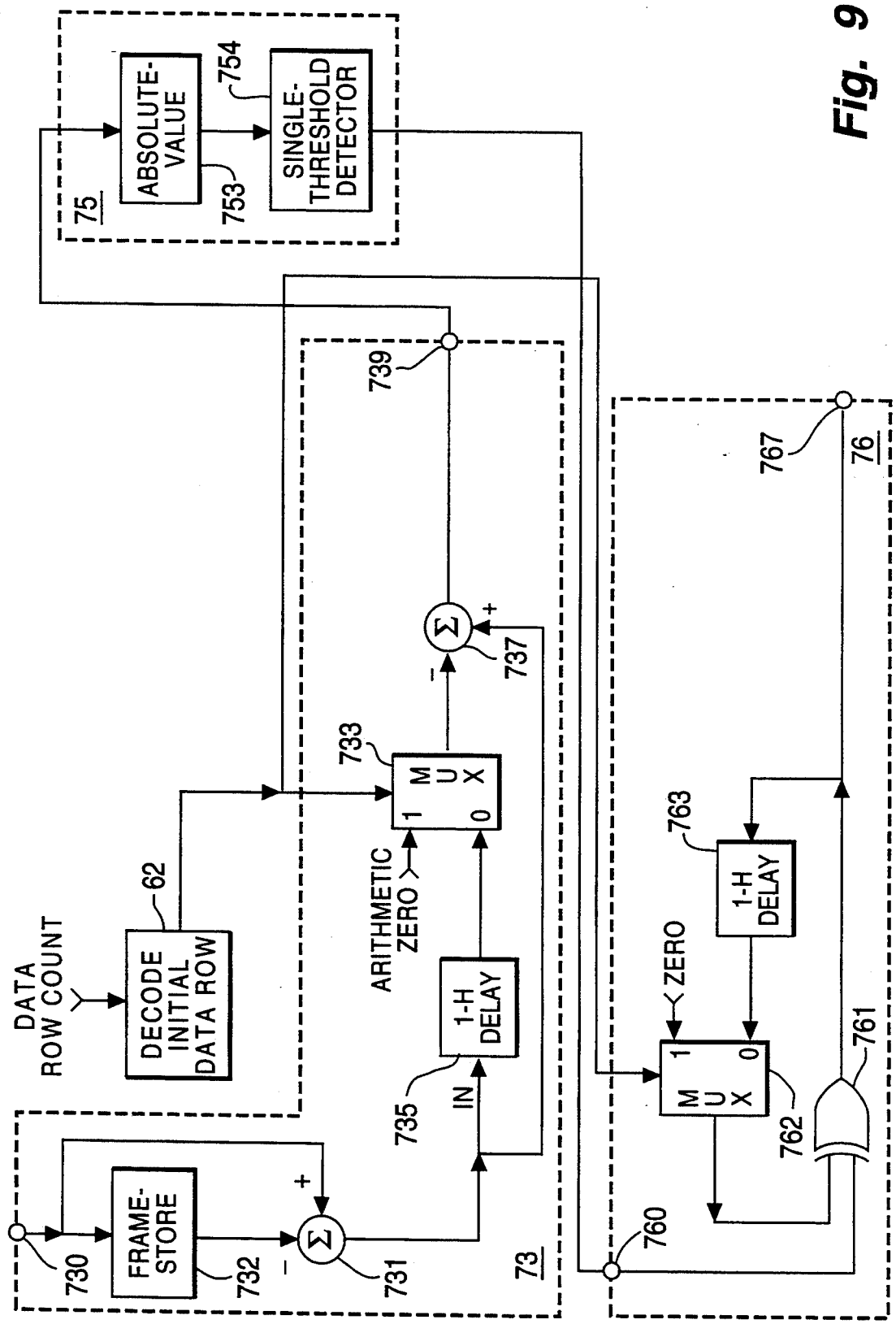

FIG. 9 shows yet another form that can be taken by the portion of the digital signal receiver 40 comprising the data separation filter 73, the symbol decision circuitry 75 and the partial-response filter 76, which form differs from that of FIG. 7 in that the line-comb filtering in the data separation filter 73 is done over two horizontal scan lines, rather than three. In FIG. 9 the elements 734, 736 and 738 in the data separation filter 73 are dispensed with, and the difference output signal from the digital subtractor 737 is applied to the output terminal 739 of the data separation filter 73. The digital signal in this output signal is ternary or three-level in nature, rather than five-level in nature. Therefore, the decision circuitry 75 is modified in FIG. 9 in the same way as in FIG. 8, so that the absolute-value circuit 753 responds to the input signal to the decision circuitry 75, and so that the absolute-value response is supplied to a single-threshold threshold detector 754, which makes a decision as to whether each symbol is most likely a ZERO or is most likely a ONE. The partial-response filter 76 is modified from the form shown in FIG. 7. The elements 764–766 are dispensed with, and the output connection of the XOR gate 761 is to the output terminal 767 of the partial-response filter 76.

FIG. 10 shows the portion of the digital signal receiver 40 comprising the data separation filter 73, the symbol decision circuitry 75 and the partial-response filter 76 being constructed so as to perform adaptive line-comb filtering. The FIG. 10 circuitry performs line-comb filtering in the data separation filter 73 over three horizontal scan lines, similar to the FIG. 7 circuitry, and over two horizontal scan lines, similar to the FIG. 9 circuitry. The FIG. 10 circuitry determines the one of the line-comb filtering responses that is least susceptible of being jammed by remnants of NTSC composite video signal in the quadrature-phase video detector 47 response and, based on that determination, selects the data symbol recovered from that line-comb filtering response for application to the rate buffer 77.

FIG. 11 charts the line-comb filtering responses of the line-comb filters of FIGS. 7 and 9 for a unit step up in the direction of vertical scan, for a unit step down in the direction of vertical scan, and for a unit pulse. One can see that line-comb filtering over three horizontal scan lines results in lower-amplitude immediate response to a transition, but that line-comb filtering over two horizontal scan lines results in lower-amplitude delayed response to a transition.

In the FIG. 10 circuitry, as in the FIG. 7 circuitry, an input terminal 730 of the data separation filter 73 receives digital samples from the ADC 106 for application to the minuend input of a digital subtractor 731 and to the input of a digital framestore 732. Digital samples read from the output of the digital framestore 732 are applied as the subtrahend input of the digital subtractor 731. The framestore 732 can be a RAM operated in a read-and-then-write-over mode, which RAM is addressed by a DATA ROW COUNT supplied from the counter 72 applied as row address and the SYMBOL PER DATA ROW COUNT from the counter 52 applied as column address. The subtractor 731 and the framestore 732 together form a highpass frame-comb filter, supplying at the output of the subtractor 731 a highpass frame-comb filter response to the digital samples received at the input terminal 730 of the data separation filter 73. The highpass frame-comb filter response from the output of the subtractor 731, in which response luma components descriptive of static image are suppressed, is supplied to a highpass line-comb filter that suppresses luma components descriptive of moving image in its response supplied at the output terminal 739 of the data separation filter 73. Luma components are suppressed in the response supplied at the output terminal 739, which is primarily constituted of highpass comb-filtered digital signal samples of 5-level form.

The structure of the highpass line-comb filter shown in FIG. 10 differs somewhat from that shown in FIG. 7, but is electrically equivalent inasfar as generating highpass line-comb filter response at terminal 739 is concerned. In FIG. 10 the write input to the 1-H delay line 736 is taken from the subtrahend input to the digital subtractor 737, rather than from its difference output as in FIG. 7. In FIG. 10 the subtrahend input to the digital subtractor 738 is taken from the difference output of a digital subtractor 7310, rather from the output of the multiplexer 734 as in FIG. 7. The digital subtractor 7310 of FIG. 10 has the subtrahend input to the subtractor 737 connected to its minuend input and has the output of the multiplexer 734 connected to its subtrahend input. In FIG. 10 the difference output from the subtractor 737 is supplied to another output terminal 7311 of the data separation filter 73, as an output signal corresponding to that supplied from the output terminal 739 of the FIG. 7 data separation filter 73. In the FIG. 10 data separation filter 73 yet another output terminal 7312 thereof is supplied the difference output from the subtractor 7310.

The FIG. 10 symbol decision circuitry 75 includes the absolute-value circuits 751 and 753 with respective input connections from the output terminals 739 and 7311, respectively, of the data separation filter 73. The signal at the output terminal 739 includes a 5-level digital signal as a component thereof. The rectified digital response of the absolute-value circuit 751 to this signal is descriptive of ternary (or 3-level) keying signal superposed on a direct-voltage pedestal. This rectified digital response is supplied to the double-threshold detector 752, which makes a decision as to whether each successive symbol is most likely a ZERO, is most likely a ONE, or is most likely a TWO, TWOs being equated to ZEROs. The signal at the output terminal 7311 includes a ternary (or 3-level) digital signal as a component thereof. The rectified digital response of the absolute-value circuit 753 to this signal is descriptive of binary keying signal superposed on a direct-voltage pedestal and is supplied to the single-threshold detector 754, which makes an alternative decision as to whether each successive symbol is most likely a ZERO or is most likely a ONE.

The FIG. 10 symbol decision circuitry 75 includes a further absolute-value circuit 755 with an input connection from the output terminal 7312 of the data separation filter 73. The output signals of the absolute-value circuits 753 and 755 are compared by a digital comparator 756 that generates a logic ONE when and only when the absolute-value response of circuit 753 exceeds the absolute-value response of circuit 755. This logic ONE indicates that the symbol decision based on three-line line-comb filter response at terminal 739 is probably better than the symbol decision based on two-line line-comb filter response at terminal 7311.

In practice, one may prefer not to switch to the three-line line-comb filter unless a string of mostly ONEs is generated by the comparator 756, which provides a more reliable indication that it is an edge of the composite video signal that is responsible for the digital comparator 756 output signal being a ONE. This mode of operation can be secured by applying the comparator 756 output signal as up/down control signal to an up/down counter counting at PSK symbol rate. The count from this up/down counter is then threshold detected by another digital comparator that generates control signal for the multiplexer 7612. This other digital comparator generates a ONE as control signal for the multiplexer 7612 only when a string of mostly ONEs occurs that is longer than the threshold value the up/down counter count is compared against.

The FIG. 10 partial-response filter 76 includes elements 760–766 corresponding in function to similarly numbered elements in the FIG. 7 partial-response filter 76 and in their connection from the double-threshold detector 752. The FIG. 10 partial-response filter 76 further includes another input terminal 768, an exclusive-OR gate 769, a two-input multiplexer 7610 and a 1-H digital delay line 7611 corresponding in function to the input terminal 760, the exclusive-OR gate 761, the two-input multiplexer 762 and the 1-H digital delay line 763 in the FIG. 9 partial-response filter 76. The FIG. 10 connection from the output of the single-threshold detector 754 to the first input of the exclusive-OR gate 769 is analogous to the FIG. 9 connection from the output of the single-threshold detector 754 to the first input of the exclusive-OR gate 761. The output terminal 767 of the FIG. 10 partial-response filter 76 connects from the output of a two-input multiplexer 7612, the first input of which connects from the output of the XOR gate 764 and the second input of which connects from the output of the XOR gate 769. The signal that the XOR gate 764 supplies to the first input of the multiplexer 7612 in FIG. 10 corresponds to the signal that the XOR gate 764 supplies to the output terminal 767 in FIG. 7, and the signal that the XOR gate 769 supplies to the second input of the multiplexer 7612 in FIG. 10 corresponds to the signal that the XOR gate 764 supplies to the output terminal 767 in FIG. 9. The output signal of the digital comparator 756 is a control signal for the multiplexer 7612. The generation of a logic ONE by the digital comparator 756 conditions the multiplexer 7612 to replicate at its output connection to the output terminal 767 the signal that the XOR gate 764 supplies to the first input of the multiplexer 7612. The generation of a logic ZERO by the digital comparator 756 conditions the multiplexer 7612 to replicate at its output connection to the output terminal 767 the signal that the XOR gate 769 supplies to the second input of the multiplexer 7612.

In FIG. 10 the first inputs of the multiplexers 733 and 734 receive respective wired arithmetic-zero input signals, which those multiplexers are conditioned to replicate at their respective outputs responsive to a decoder 62 supplying them a logic ONE as a control signal. In FIG. 10 the first inputs of the multiplexers 762, 765 and 7610 receive respective wired logic-ZERO input signals, which those multiplexers are conditioned to replicate at their respective outputs responsive to a decoder 62 supplying them a logic ONE as a control signal. The decoder 62 generates a logic ONE when and only when the DATA ROW COUNT signal is indicative of the initial row of a data frame being reached. Otherwise, the decoder 62 generates a logic ZERO as a control signal for the multiplexers 733, 734, 762, 765 and 7610, conditioning them to replicate at their respective outputs the signals applied to their respective second inputs.

FIG. 12 shows a variant of the FIG. 10 circuitry, which has the same type of symbol decision circuitry 75. The data separation filter 73 and the partial-response filter 76 in FIG. 12 differ from those in FIG. 10, however, in that the two-input multiplexers 733, 734, 762, 765 and 7610 are repositioned for affecting writing to the 1-H delays 735, 736, 763, 766 and 7611, rather than affecting their reading. The first inputs of the multiplexers 733 and 734 in the FIG. 12 data separation filter 73 receive respective wired arithmetic-zero input signals, which those multiplexers are conditioned to replicate at their respective outputs responsive to a decoder 61 supplying them a logic ONE as a control signal. The first inputs of the multiplexers 762, 765 and 7610 in the FIG. 12 partial-response filter 76 receive respective wired logic-ZERO input signals, which those multiplexers are conditioned to replicate at their respective outputs responsive to a decoder 61 supplying them a logic ONE as a control signal. The decoder 61 generates a logic ONE when and only when the DATA ROW COUNT signal is indicative of the final row of a data frame being reached. Otherwise, the decoder 61 generates a logic ZERO as a control signal for the multiplexers 733, 734, 762, 765 and 7610, conditioning them to replicate at their respective outputs the signals applied to their respective second inputs.

FIG. 13 shows modifications that can be made to any of the digital-signal receivers thusfar described. These modifications are made to reduce the likelihood of error owing to frame-to-frame changes between the paired frames in which data is transmitted in one logic sense during the earlier frame and is re-transmitted in opposite logic sense during the later frame. When substantial frame-to-frame changes between the paired frames in which data is transmitted in one logic sense during the earlier frame and is retransmitted in opposite logic sense during the later frame are detected, if the frame-to-frame changes between the earlier frame and the immediately preceding frame are smaller, highpass frame-comb filter response to the earlier frame and the immediately preceding frame provides a better basis for subsequent highpass line-comb filtering and symbol decision.

In FIG. 13, as in any of the FIGS. 6–10 and 12, the input terminal 730 receives digital samples from the ADC 106 for application to the minuend input of the digital subtractor 731 and to the input of the digital framestore 732. Digital samples read from the output of the digital framestore 732 are applied as the subtrahend input of the digital subtractor 731. The subtractor 731 and the framestore 732 together form a highpass frame-comb filter, supplying at the output of the subtractor 731 a highpass frame-comb filter response to the digital samples received at the input terminal 730. The highpass frame-comb filter response from the output of the subtractor 731, in which response luma components descriptive of static image are suppressed, is supplied to a block 200 of circuitry. This block 200 of circuitry comprises a highpass line-comb filter for further filtering the highpass frame-comb filter response from the subtractor 731, symbol decision circuitry 75 following the highpass line-comb filter, and a post-line-comb-filter partial response filter 76 following the symbol decision circuitry. The circuitry in the block 200 can be similar to what is shown in any one of FIGS. 6–10 and 12.

The 1-frame-delayed response of framestore 732 to digital samples received at the input terminal 730 is applied to the minuend input of a digital subtractor 201 and to the write input of a further digital framestore 202. Digital samples read from the output of the digital framestore 202 are applied as the subtrahend input of the digital subtractor 201. The subtractor 201 and the framestore 202 together form a highpass frame-comb filter, supplying at the output of the subtractor 201 a highpass frame-comb filter response to the digital samples received at the input terminal 730 one frame previously. The highpass frame-comb filter response from the output of the subtractor 201, in which response luma components descriptive of static image are suppressed, is supplied to a block 203 of circuitry. This block 203 of circuitry comprises a highpass line-comb filter for further filtering the highpass frame-comb filter response from the subtractor 201, symbol decision circuitry following the highpass line-comb filter, and a post-line-comb-filter partial-response filter following the symbol decision circuitry. The highpass line-comb filters in blocks 200 and 203 are similar in structure, and the post-line-comb-filter partial-response filters in blocks 200 and 203 are similar in structure. The symbol decision circuitry in block 203 differs from that in block 200, 3-level symbol decision circuitry being replaced by 5-level symbol decision circuitry, and 5-level symbol decision circuitry being replaced by 9-level symbol decision circuitry.

The bit-serial digital signal supplied from the block 203 of circuitry is applied to a post-frame-comb-filter partial-response filter, shown in FIG. 13 as comprising a two-input exclusive-OR gate 204 and a one-bit-deep digital framestore 205. The block 203 of circuitry supplies its bit-serial output signal to the first input of the XOR gate 204. The output of the XOR gate 204 connects to the first input of a two-input multiplexer 206, the second input of which is connected for receiving the bit-serial output signal of the block 200 of circuitry. The output of the multiplexer 206 supplies a selected bit-serial output signal to the rate buffer 77 via an output terminal 207, and this selected bit-serial output signal is supplied to the write input of the framestore 205 in the post-frame-comb-filter partial-response filter and one frame later is applied from the read output of the framestore 205 to the second input of the XOR gate 204. One skilled in the art of digital design will understand that the rate buffer 77 may be written with selected bit-serial output signal on alternate frames such that the selected bit-serial output signal as delayed by a single frame can be read back to the second input of the XOR gate 204 without need for a separate one-bit-deep digital framestore 205.

The difference output signals of the subtractors 731 and 201 are supplied as the respective input signals of absolute-value circuits 208 and 209. The absolute-value responses of the circuits 208 and 209 are compared by a digital comparator 210 in order to develop a control signal for the multiplexer 206, which control signal selects which of the signals received at its first and second inputs will be replicated in its output signal.

When the response from the absolute-value circuit 208 is less than the response from the absolute-value circuit 209, this is indicative that the highpass frame-comb filtering by the subtractor 731 and the framestore 732 reduces the remnant composite video signal accompanying digital data better than the highpass frame-comb filtering by the subtractor 201 and the framestore 202 does. Accordingly, the digital comparator 210 supplies a control signal to the multiplexer 206 conditioning its output signal to replicate its second input signal as supplied from the block 200 of circuitry. Operation resembles that of the FIGS. 6, 7, 8, 9, 10 or 12 circuitry duplicated by the subtractor 731, the framestore 732 and the block 200 of circuitry.

When the response from the absolute-value circuit 208 exceeds the response from the absolute-value circuit 209, this is indicative that the highpass frame-comb filtering by the subtractor 731 and the framestore 732 does not reduce the remnant composite video signal accompanying digital data as well as the highpass frame-comb filtering by the subtractor 201 and the framestore 202 does. Accordingly, the digital comparator 210 supplies a control signal to the multiplexer 206 conditioning its output signal to replicate its first input signal as supplied from the XOR gate 204.

The data transmission schemes described in this specification provide for a single, reasonably-wideband data transmission channel. A variety of different services can be provided via this single data transmission channel using time-division-multiplex schemes of various types. For example, data can be transmitted in packets with each successive packet being provided header information for indicating the nature of the data service provided and the originator of the data service. The television broadcasters and the cablecaster can be originators of various data services. In two-way data transmission schemes the packet heading identifying the originator can be used for selecting the proper data return channel, such as a telephone link or a dedicated channel in a cablecast system.

The embodiments of the invention currently preferred by the inventors have been described, but one skilled in the art of communications systems, transmitter and receiver design will be enabled by acquaintance with the foregoing disclosure to design a number of alternative embodiments of the invention; and this should be borne in mind when construing the scope of the claims which follow this specification.

What is claimed is:

1. A system for transmitting digital information together with a composite video signal said system comprising:
   a source of audio signal;
   a source of composite video signal descriptive of successive horizontal scan lines of successive video frames, said successive video frames having a prescribed video frame rate, said successive horizontal scan lines having a prescribed horizontal scan line rate, and each of said video frames consisting of a prescribed number of horizontal scan lines of said composite video signal, said composite video signal having horizontal and vertical synchronizing pulses inserted therewithin;
   a source of said digital information;
   an error-correction coder for inserting forward error correction coding into said digital information and converting the result to a first bit-serial signal;

means for parsing said first bit-serial signal into data frames;

first and second framestore memories each having respective storage locations addressable by row and column addresses for storing bits of a data frame, said first and second framestore memories being alternatively written by respective ones of consecutive said data frames of said first bit-serial signal on a column by column basis, each of said first and second framestore memories being twice read on a row by row basis each time the other is being written by one of said data frames, thereby to supply by its reading a second bit-serial signal at a bit rate that is a multiple of said prescribed horizontal scan line rate;

a converter for converting said second bit-serial signal into a binary phase-shift-keying signal, which converter does not include any partial-response filtering;

a frequency-modulation transmitter for modulating the frequency of an audio carrier wave in accordance with said audio signal, thereby to generate a respective output signal;

a first vestigial-sideband amplitude-modulation transmitter for modulating the amplitude of a video carrier wave in accordance with said composite video signal, thereby to generate a respective output signal;

a second vestigial-sideband amplitude-modulation transmitter for modulating the amplitude of a suppressed carrier wave in accordance with said binary phase-shift-keying signal, thereby to generate a respective output signal; and a frequency multiplexer for combining the respective output signals of said first and second vestigial-sideband amplitude-modulation transmitters with the output signal of said frequency-modulation transmitter, such that said suppressed carrier wave is in quadrature phasing with said video carrier wave.

2. A digital signal receiver for use with a system which in a combined transmission with a video carrier wave the amplitude of which is modulated in accordance with a composite video signal a first bit-serial digital signal is transmitted in binary phase-shift keying modulation sidebands of a suppressed carrier wave in quadrature phasing with said video carrier wave, said digital signal receiver comprising:

detection apparatus for responding to said combined transmission to detect the binary phase-shift keying of said suppressed carrier wave and thereby generate a desired detector response, as accompanied by undesired detector response composed of remnants of the composite video signal detected from the amplitude-modulated video carrier wave;

a cascade connection of a highpass frame-comb filter and a highpass line-comb filter for selecting against said undesired detector response in a combined comb filter response supplied from said cascade connection, said combined comb filter response having multiple levels of response to each digital symbol;

symbol decision circuitry responsive to said combined comb filter response for deciding the identity of each successive phase-shift keying symbol, thereby to generate a corresponding bit in a second bit-serial digital signal; and a partial-response filter, responding to said second bit-serial digital signal, for generating a third bit-serial digital signal that substantially reproduces said first bit-serial digital signal.

3. A digital signal receiver as set forth in claim 2 wherein said highpass digital line-comb filter comprises:

an input connection of said highpass digital line-comb filter for receiving said highpass digital frame-comb filter response;

an output connection of said highpass digital line-comb filter for supplying said combined comb filter response;

a first 1-H delay line for delaying said highpass digital frame-comb filter response, as received at the input connection of said highpass digital line-comb filter by a time interval equal to the duration of a horizontal scan line of said composite video signal;

a first digital subtractor having a first input connection for receiving the delayed response from said first 1-H delay line, having a second input connection connected without substantial delay from the input connection of said highpass digital line-comb filter, and having an output connection for supplying differential response to signals at the first and second input connections of said first digital subtractor;

a second 1-H delay line for delaying the differential response of said second digital subtractor by a time interval equal to the duration 1-H; and a second digital subtractor having a first input connection for receiving the delayed response from said second 1-H delay line, having a second input connection connected without substantial delay from the output connection of said second digital subtractor, and having an output connection for supplying differential response to signals at the first and second input connections of said second digital subtractor to the output connection of said highpass digital line-comb filter.

4. A digital signal receiver as set forth in claim 3 wherein said symbol decision circuitry comprises:

an absolute-value circuit having an input connection for receiving said combined comb filter response and having an output connection for supplying a rectified response; and a dual-threshold detector having an input connection for receiving said rectified response from the output connection of said absolute-value circuit and having an output connection for supplying bits of a digital signal, each bit being in a first state when said rectified response exceeds a first threshold level but not a second threshold level higher than the first threshold level, and each bit being in a second state when said rectified response does not exceed said first threshold level or exceeds both said first and said second threshold levels.

5. A digital signal receiver as set forth in claim 4 wherein said partial-response filter comprises:

respective input and output terminals;

a first two-input exclusive-OR gate having a respective first input connection from the input terminal of said partial-response filter, having a respective second input connection, and having a respective output connection at which first exclusive-OR gate response is provided;

a third 1-H delay line having an input connection from the output connection of said first exclusive-OR gate and having an output connection to the second input connection of said first exclusive-OR gate, said third 1-H delay line delaying said first exclusive-OR gate response as applied to the second input connection of said first exclusive-OR gate for a time interval equal to the duration 1-H of a horizontal scan line having said prescribed horizontal scan line rate;

a second two-input exclusive-OR gate having a respective first input connection from the output connection of said first exclusive-OR gate, having a respective second input connection, and having a respective output connection at which second exclusive-OR gate response is provided, the output connection of said second exclusive-OR gate being connected to the output terminal of said partial-response filter; and a fourth 1-H delay line having an input connection from the output connection of said second exclusive-OR gate and having an output connection to the second input connection of said second exclusive-OR gate, said fourth 1-H delay line delaying said second exclusive-OR gate response as applied to the second input connection of said second exclusive-OR gate for a time interval equal to the duration 1-H of a horizontal scan line having said prescribed horizontal scan line rate.

6. A digital signal receiver as set forth in claim 2 wherein said highpass digital line-comb filter comprises:

an input connection of said highpass digital line-comb filter for receiving said highpass digital frame-comb filter response;

an output connection of said highpass digital line-comb filter for supplying said combined comb filter response;

a 1-H digital delay line for delaying said highpass digital frame-comb filter response, as received at the input connection of said highpass digital line-comb filter by a time interval equal to the duration of a horizontal scan line of said composite video signal; and a second digital subtractor having a first input connection for receiving the delayed response from said 1-H digital delay line, having a second input connection connected without substantial delay from the input connection of said highpass digital line-comb filter, and having an output connection for supplying differential response to signals at the first and second input connections of said second digital subtractor to the output connection of said highpass digital line-comb filter.

7. A digital signal receiver as set forth in claim 6 wherein said symbol decision circuitry comprises:

an absolute-value circuit having an input connection for receiving said combined comb filter response and having an output connection for supplying a rectified response; and a threshold detector having an input connection for receiving said rectified response from the output connection of said absolute-value circuit and having an output connection for supplying bits of a digital signal, each bit being in a first state when said rectified response exceeds a threshold level and being in a second state when said rectified response does not exceed said threshold level.

8. A digital signal receiver as set forth in claim 7 wherein said partial-response filter comprises:
respective input and output terminals;

a two-input exclusive-OR gate having a respective first input connection from the input terminal of said partial-response filter, having a respective second input connection, and having a respective output connection at which exclusive-OR gate response is provided, the output connection of said exclusive-OR gate being connected to the output terminal of said partial-response filter; and a third 1-H delay line having an input connection from the output connection of said exclusive-OR gate and having an output connection to the second input connection of said exclusive-OR gate, said third 1-H delay line delaying said exclusive-OR gate response as applied to the second input connection of said exclusive-OR gate for a time interval equal to the duration 1-H of a horizontal scan line having said prescribed horizontal scan line rate.

9. A digital signal receiver for use with a system which in a combined transmission with a video carrier wave the amplitude of which is modulated in accordance with a composite video signal transmits binary phase-shift keying modulation sidebands of a suppressed carrier wave in quadrature phasing with said video carrier wave, a first bit-serial digital signal being encoded in a binary phase-shift keying signal having a prescribed phase-shift keying rate that is a multiple of a horizontal scan line rate for said composite video signal and modulating the amplitude of said suppressed carrier to generate said binary phase-shift keying modulation sidebands thereof, said combined transmission being made after vestigial-sideband filtering, said digital signal receiver comprising:

a tuner for supplying intermediate-frequency signal response to a selected radio-frequency signal comprising an amplitude-modulated video carrier wave modulated in accordance with a composite video signal and a binary phase-shift-keyed suppressed carrier wave in quadrature phasing with said video carrier wave, said binary phase-shift-keyed suppressed carrier wave being modulated in accordance with a binary phase-shift-keying signal encoding a first bit-serial digital signal;

an intermediate-frequency amplifier for said intermediate-frequency signal response, said intermediate-frequency amplifier including filtering and amplifying elements and supplying an amplified intermediate-frequency amplifier response;

first controlled oscillator circuitry for generating in-phase and quadrature-phase intermediate-frequency video carrier waves, at an intermediate frequency and average phase which are controlled by a frequency and phase error signal;

an in-phase video detector receptive of said amplified intermediate-frequency amplifier response for synchronously detecting, in accordance with said in-phase intermediate-frequency video carrier wave supplied thereto, modulation of the amplitude of said video carrier to generate an in-phase detected signal in which said composite video signal is regenerated, because of said vestigial-sideband filtering the regenerated composite video signal being accompanied by upper-frequency remnants of said binary phase-shift keying signal;

a quadrature-phase video detector receptive of said amplified intermediate-frequency amplifier response for synchronously detecting, in accordance with said quadrature-phase intermediate-frequency video carrier wave supplied thereto, modulation of the amplitude of said video carrier to generate a quadrature-phase detected signal in which said binary phase-shift-keying signal is regenerated accompanied by said frequency and phase error signal, because of said vestigial-sideband filtering the regenerated binary phase-shift-keying signal being further accompanied by at least upper-frequency remnants of said composite video signal;

a horizontal sync separator for separating horizontal synchronizing pulses from the composite video signal detected by said in-phase video detector;

line-locked second controlled oscillator circuitry for generating clocking oscillations at a frequency and phase controlled by said separated horizontal synchronizing pulses, which oscillations are at a multiple of said horizontal scan line rate for said composite video signal;

an analog-to-digital converter having an input connection for receiving said quadrature-phase detected signal as its analog input signal and having an output connection for supplying digitized response to samples of said quadrature-phase detected signal, as sampled at said prescribed phase-shift keying rate to provide a digital quadrature-phase detected signal;

a cascade connection of a highpass frame-comb filter and a highpass line-comb filter for providing a combined comb filter response to said digital quadrature-phase detected signal, said remnants of said composite video signal being suppressed in said combined comb filter response, which has multiple levels of response to phase-shift keying symbols;

symbol decision circuitry responsive to said combined comb filter response for deciding the identity of each phase-shift keying symbol, thereby to generate each successive bit in a second bit-serial digital signal; and a partial-response filter, responding to said second bit-serial digital signal, for generating a third bit-serial digital signal that substantially reproduces said first bit-serial digital signal.

10. A digital signal receiver as set forth in claim 9 further comprising:

a symbol-per-data-row counter counting in response to average-axis crossings of the oscillations of said line-locked second controlled oscillator circuitry to generate a symbol-per-data-row count, said symbol-per-data-row counter periodically reset to an initial value of symbol-per-data-row count responsive to the horizontal synchronizing pulses from said horizontal sync separator;

a data row counter for counting horizontal synchronizing pulses supplied from said horizontal sync separator to generate a data row count, each value of which data row count corresponds to a value of scan line count, said data row counter periodically reset to an initial value of data row count responsive to vertical synchronizing pulses supplied from said vertical sync separator;

a first framestore random-access memory included in said highpass frame-comb filter, written by input signal to said highpass frame-comb filter, arranged to have storage locations therein row-addressed by said data row count and column-addressed by said symbol-per-data-row count, and operated in a read-and-then-write-over mode for reproducing the input signal to said highpass frame-comb filter with a one-frame delay; and a first digital subtractor included in said highpass frame-comb filter for differentially combining the input signal to said highpass frame-comb filter with that signal as reproduced from said first framestore random-access memory with a one-frame delay, thereby to generate a first difference signal supplied as response from said highpass frame-comb filter.

11. A digital signal receiver as set forth in claim 10 wherein said highpass line-comb filter includes:

a first linestore random-access memory written by input signal to said highpass line-comb filter, arranged to have storage locations therein addressed by said symbol-per-data-row count, and operated in a read-and-then-write-over mode for reproducing the input signal to said highpass line-comb filter with a one-line delay; and a second digital subtractor for differentially combining the input signal to said highpass line-comb filter with that signal as reproduced from said first linestore random-access memory with a one-frame delay, thereby to generate a second difference signal supplied as response from said highpass line-comb filter.

12. A digital signal receiver as set forth in claim 11, wherein said partial-response filter comprises, in a cascade connection of a post-line-comb-filter partial-response filter section and a post-frame-comb-filter partial-response filter section thereof:

a second framestore random-access memory included in said post-frame-comb-filter partial-response filter section, written by input signal to said post-frame-comb-filter partial-response filter section, arranged to have storage locations therein row-addressed by said data row count and column-addressed by said symbol-per-data-row count, and operated in a read-and-then-write-over mode for reproducing the input signal to said post-frame-comb-filter partial-response filter section with a one-frame delay;

a first exclusive-OR gate included in said post-frame-comb-filter partial-response filter section, for exclusively ORing the input signal to said post-frame-comb-filter partial-response filter section with that signal as reproduced from said second framestore random-access memory with a one-frame delay, thereby to generate a first exclusive-OR gate response supplied as response from said post-frame-comb-filter partial-response filter section;

a second linestore random-access memory included in said post-line-comb-filter partial-response filter section, written by input signal to said post-line-comb-filter partial-response filter section, arranged to have storage.locations therein addressed by said symbol-per-data-row count, and operated in a read-and-then-write-over mode for reproducing the input signal to said post-line-comb-filter partial-response filter section with a one-line delay; and a second exclusive-OR gate included in said post-line-comb-filter partial-response filter section, for exclusively ORing the input signal to said post-line-comb-filter partial-response filter section with that signal as reproduced from said second linestore random-access memory with a one-frame delay, thereby to generate a second exclusive-OR gate response supplied as response from said post-line-comb-filter partial-response filter section.

13. A digital signal receiver as set forth in claim 12 further comprising:

a modulo-4 data frame counter responding to at least selected ones of said separated vertical synchronizing pulses for generating a modulo-4 data frame count, the less significant bit of which is a modulo-2 data frame count and the more significant bit of which is a modulo-2 data frame pair count;

a symbol-per-data-column counter counting in response to average-axis crossings of the oscillations of said line-locked controlled oscillator to generate a symbol-per-data-column count and supplying a full-count-reached signal whenever said symbol-per-data-column count has attained a prescribed full-count value and rolls over to an initial-count value, said symbol-per-data-column counter periodically reset to said initial-count value of symbol-per-data-column count responsive to the horizontal synchronizing pulses from said horizontal sync separator;

a data column counter for counting full-count-reached signals supplied from said symbol-per-data-column counter to generate a data column count, said data column counter periodically reset to an initial value of data column count responsive to vertical synchronizing pulses supplied from said vertical sync separator;

a rate buffer operative as a de-interleaver for supplying a deinterleaved output signal responsive to output signal from said partial-response filter supplied to said rate buffer as its input signal, said rate buffer receiving as control signals said modulo-4 data frame count, said symbol-per-data-row count, said data row count, said symbol-per-data-column count, and said data column count; and an error-correction-code decoder responding to output signal from said rate buffer for correcting errors therein.

14. A digital signal receiver as set forth in claim 10 wherein said highpass line-comb filter includes:

a first linestore random-access memory written by input signal to said highpass line-comb filter, arranged to have storage locations therein addressed by said symbol-per-data-row count, and operated in a read-and-then-write-over mode for reproducing the input signal to said highpass line-comb filter with a one-line delay;

a second digital subtractor for differentially combining the input signal to said highpass line-comb filter with that signal as reproduced from said first linestore random-access memory with a one-line delay, thereby to generate a second difference signal;

a second linestore random-access memory written by said second difference signal, arranged to have storage locations therein addressed by said symbol-per-data-row count, and operated in a read-and-then-write-over mode for reproducing said second difference signal with a one-line delay; and a third digital subtractor for differentially combining said second difference signal with that signal as reproduced from said second linestore random-access memory with a one-line delay, thereby to generate a third difference signal supplied as response from said highpass line-comb filter.

15. A digital signal receiver as set forth in claim 14, wherein said partial-response filter comprises, in a cascade connection of a post-line-comb-filter partial-response filter section and a post-frame-comb-filter partial-response filter section thereof:

a second framestore random-access memory included in said post-frame-comb-filter partial-response filter section, written by input signal to said post-frame-comb-filter partial-response filter section, arranged to have storage locations therein row-addressed by said data row count and column-addressed by said symbol-per-data-row count, and operated in a read-and-then-write-over mode for reproducing the input signal to said post-frame-comb-filter partial-response filter section with a one-frame delay;

a first exclusive-OR gate included in said post-frame-comb-filter partial-response filter section, for exclusively ORing the post-frame-comb-filter partial-response filter section, as reproduced from said second framestore random-access memory with a one-frame delay, and as directly received without delay, to generate a first exclusive-OR gate response supplied as response from said post-frame-comb-filter partial-response filter section;

a third linestore random-access memory included in said post-line-comb-filter partial-response filter section, written by input signal to said post-line-comb-filter partial-response filter section, arranged to have storage locations therein addressed by said symbol-per-data-row count, and operated in a read-and-then-write-over mode for reproducing the input signal to said post-line-comb-filter partial-response filter section with a one-line delay;

a second exclusive-OR gate included in said post-line-comb-filter partial-response filter section, for exclusively ORing the input signal to said post-line-comb-filter partial-response filter section with that signal as reproduced from said second linestore random-access memory with a one-line delay, to generate a second exclusive-OR gate response;

a fourth linestore random-access memory included in said post-line-comb-filter partial-response filter section, written by said second exclusive-OR gate response, arranged to have storage locations therein addressed by said symbol-per-data-row count, and operated in a read-and-then-write-over mode for reproducing said second exclusive-OR gate response with a one-line delay; and a third exclusive-OR gate included in said post-line-comb-filter partial-response filter section, for exclusively ORing said second exclusive-OR gate response with said second exclusive-OR gate response as reproduced from said fourth linestore random-access memory with a one-line delay, to generate a third exclusive-OR gate response supplied as response from said post-line-comb-filter partial-response filter section.

16. A digital signal receiver as set forth in claim 15 further comprising:

a modulo-4 data frame counter responding to at least selected ones of said separated vertical synchronizing pulses for generating a modulo-4 data frame count, the less significant bit of which is a modulo-2 data frame count and the more significant bit of which is a modulo-2 data frame pair count;

a symbol-per-data-column counter counting in response to average-axis crossings of the oscillations of said line-locked controlled oscillator to generate a symbol-per-data-column count and supplying a full-count-reached signal whenever said symbol-per-data-column count has attained a prescribed full-count value and rolls over to an initial-count value, said symbol-per-data-column counter periodically reset to said initial-count value of symbol-per-data-column count responsive to the horizontal synchronizing pulses from said horizontal sync separator;

a data column counter for counting full-count-reached signals supplied from said symbol-per-data-column counter to generate a data column count, said data column counter periodically reset to an initial value of data column count responsive to vertical synchronizing pulses supplied from said vertical sync separator;

a rate buffer operative as a de-interleaver for supplying a de-interleaved output signal responsive to output signal from said partial-response filter supplied to said rate buffer as its input signal, said rate buffer receiving as control signals said modulo-4 data frame count, said symbol-per-data-row count, said data row count, said symbol-per-data-column count, and said data column count; and an error-correction-code decoder responding to output signal from said rate buffer for correcting errors therein.

* * * * *